US012662757B2

(12) United States Patent
Tsou et al.

(10) Patent No.: US 12,662,757 B2
(45) Date of Patent: Jun. 23, 2026

(54) THERMOPLASTIC POLYURETHANE SELF-CRIMPING CONJUGATE FIBER AND FABRIC

(71) Applicant: SUNKO INK CO., LTD., Taichung City (TW)

(72) Inventors: Chiu-Peng Tsou, Taichung City (TW); Zhen-Wei Chen, Taichung City (TW); Ting-Ti Huang, Taichung City (TW)

(73) Assignee: SUNKO INK CO., LTD., Taichung City (TW)

( * ) Notice: Subject to any disclaimer, the term of this patent is extended or adjusted under 35 U.S.C. 154(b) by 204 days.

(21) Appl. No.: 18/790,266

(22) Filed: Jul. 31, 2024

(65) Prior Publication Data

US 2025/0283254 A1 Sep. 11, 2025

(30) Foreign Application Priority Data

Mar. 6, 2024 (TW) ................................ 113108227

(51) Int. Cl.
*D01F 8/16* (2006.01)
*C08L 75/06* (2006.01)
*D04B 1/16* (2006.01)

(52) U.S. Cl.
CPC ................ *D01F 8/16* (2013.01); *C08L 75/06* (2013.01); *D04B 1/16* (2013.01); *C08L 2203/12* (2013.01); *C08L 2205/025* (2013.01); *D10B 2331/10* (2013.01); *D10B 2401/063* (2013.01)

(58) Field of Classification Search
CPC .......................................................... D01F 8/16
See application file for complete search history.

(56) References Cited

U.S. PATENT DOCUMENTS 5,164,262 A * 11/1992 Kobayashi ................ D01F 8/16 428/374
2004/0013877 A1* 1/2004 Nadkarni ........... D04H 1/43832 264/210.8
2021/0087326 A1* 3/2021 Tsou .................. C08G 63/6926

* cited by examiner

*Primary Examiner* — Andrew T Piziali
(74) *Attorney, Agent, or Firm* — WPAT, PC

(57) ABSTRACT

Provided are a thermoplastic polyurethane (TPU) self-crimping conjugate fiber and a fabric. The TPU self-crimping conjugate fiber comprises: a first component including a first TPU and a second component including a second TPU, which is a TPU other than the first TPU. Wherein the first TPU has a damping factor (tanδ) peak within the temperature range from 20° C. to 100° C.; the second TPU has a tanδ peak within the temperature range from −50° C. to 70° C. Based on the total weight of the first component, the content of the first TPU is 50% by weight or more. The first TPU has a structural unit represented by Formula (I):

(I)

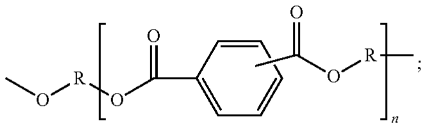

wherein each R independently is an alkylene group having 2 to 8 carbon atoms or $-CH_2CH_2OCH_2CH_2-$; n is a number from 2 to 13; and the structural unit has a Mn ranging from 700 g/mole to 2500 g/mole.

20 Claims, 9 Drawing Sheets

THERMOPLASTIC POLYURETHANE SELF-CRIMPING CONJUGATE FIBER AND FABRIC

CROSS-REFERENCE TO RELATED APPLICATION

Pursuant to 35 U.S.C. § 119(a), this application claims the benefit of the priority to Taiwan Patent Application No. 113108227, filed on Mar. 6, 2024. The content of the prior application is incorporated herein by its entirety.

BACKGROUND OF THE INVENTION

1. Field of the Invention

The present disclosure relates to a conjugate fiber, and more particular to a self-crimping conjugate fiber comprising a thermoplastic polyurethane (TPU). The present disclosure also relates to a fabric comprising the same.

2. Description of the Prior Arts

Due to a continuously growing middle class across the globe and the emergence of the "fast fashion" phenomenon, the demand for textiles continues to increase. However, in addition to the sharp decline in clothing utilization (the average number of times a garment is worn before it is no longer used), the fast fashion also has some problems such as textile scraps and unsold products in stock. If textiles (such as clothing) and shoes are directly discarded, plastic microparticle pollution in the environment may become increasingly serious, causing the negative impacts of energy consumption and climate on the fashion industry to increase continuously. Therefore, with the global trend of the circular economy due to Environmental, Social and Corporate Governance (ESG), governments around the world have promoted sustainable development policies and led to a series of new policies and regulations; therefore, finding solutions for the problems of textile production and waste disposal becomes a pressing issue.

At present, there are two main categories of recycling methods for waste textiles: mechanical recycling and chemical recycling. However, the mechanical recycling cannot easily separate fibers of different materials from waste textiles; on the other hand, although the chemical recycling can separate blended fibers, it will cost much and have a serious negative impact on the environment.

In order to directly recycle after use, reduce classification processes, reduce recycling costs and increase recycling volume, companies in the textile and shoe industries have a strong interest in the research and development of single material for products under the promotion from the brand owners; among those materials to be chosen, the most commonly ones as raw materials may be polyester, polyamide (PA) and TPU to substitute environmentally unfriendly solvent-based polyurethane (PU) resins, thermosetting resins and various blended materials.

Fibers or yarns made of polyesters and PA are widely used in daily necessities such as textiles, clothing and shoes. However, from the perspective of a single material for the entire shoe, the high hardness of polyesters and PA is unfavorable to application in parts of the shoe which require softness, elasticity and wear resistance. As for TPU resins, they belong to a kind of thermoplastic elastomers, and they are degradable and recyclable, so TPU resins can effectively reduce the impact of plastic products on the ecological environment.

In practice, through processes such as foaming, injection, extrusion, and lamination, TPU resins have been widely used in lightweight midsoles, outsoles, insoles, hot melt adhesives, general shoe uppers or decorations for clothes. However, in general, the single-component TPU fibers have greater shrinkage, and the fabric produced thereof has the texture of plastic products. Moreover, under the high tension and friction of the reciprocating knitting process, some fibers are prone to breakage or fluffing, causing troubles in knitting processing. Further, since the popular elements in the textile, clothing and footwear industries are often rapidly changing and diverse, when it is necessary to produce a comfortable 3D knitted upper with visual design, the required fibers must withstand the high tension and high friction of the transverse knitting process. The conventional TPU fibers cannot meet all requirements.

Therefore, in order to adjust the various properties of TPU fibers, some companies have invested in research into TPU conjugate fibers. For example, TW201432107A relates to a bicomponent fiber, comprising (i) a first TPU component; and (ii) a second TPU component, which may be the same as or different from component (i), wherein at least one of components (i) and (ii) is crosslinked by a crosslinker to form at least one polymer of polymer (i) and polymer (ii). The bicomponent fibers are superior in recovery, heat-bonding behavior and chemical-resistance, so they are suitable to apply to making knitted or woven fabrics with excellent elasticity and stretchability. However, said bicomponent fiber still reacts with the crosslinker, so it is unfavorable to subsequent recycling and reuse and cannot meet the environmental protection needs.

In addition, TW202111175A provides a bicomponent fiber made from two different polyester TPUs has a core and sheath structure. Said bicomponent fiber has an enhanced clarity and low shrinkage. The two different polyester TPUs are a first TPU based on butanediol succinate and a second TPU based on butanediol adipate, and the two polyester TPUs each have its own melting enthalpy in a certain range and contact clarity in a certain range. However, this patent does not mention that the above-mentioned bicomponent fiber is self-crimping.

In addition, from the perspective of the development of self-crimping composite fibers, it was originally intended to achieve a wool fiber-like structure and self-crimping effect to obtain functions of wearing comfort such as appropriate elasticity and stretchability and uniformity of appearance. Therefore, there are still many related studies ongoing until now. For example, an international patent application WO2023095764A1 provides a composite fiber with a crimp configuration; the composite fiber consists of two kinds of polyesters with a similar structure, but the two kinds of polyesters have a molecular weight difference of 5,000 or more; the composite fiber is produced by a multi-spinning with an eccentric core-sheath type. This patent can obtain the composite fiber with a specific structure during spinning by controlling the polymer used for the composite fiber and the cross section in the direction perpendicular to the fiber axis of the composite fiber, so that the composite fiber can exhibit a high elasticity and good crimping performance; as a result, the composite fibers can be made into cloth as the comfortable clothing.

The above-mentioned prior arts do not provide any self-crimping conjugate fibers mainly made of different TPUs. Therefore, how to develop a novel TPU self-crimping conjugate fiber that can simultaneously realize the environmental protection concept of "recyclable resources" and meet the requirements such as softness and easy fabric manufacturing has become the focus of people skilled in the art.

SUMMARY OF THE INVENTION

In order to overcome the shortcomings of the prior arts, an objective of the present disclosure is to provide a TPU conjugate fiber with good curl and fluffiness, and the fabric made from the conjugate fiber has advantages of good elasticity, softness, and richly fluffy feel.

Another objective of the present disclosure is to provide an easy-knitting fiber which can withstand the tension requirement during transverse knitting process, thereby being suitable to various weaving methods.

Another objective of the present disclosure is to provide a conjugate fiber, and the product made thereof is easy to recycle and reuse, thereby achieving the goal of circular economy.

To achieve the foresaid objective, the present disclosure provides a TPU self-crimping conjugate fiber. The TPU self-crimping conjugate fiber comprises a first component including a first TPU; and a second component including a second TPU, which is a TPU other than the first TPU.

Wherein the first TPU has a damping factor (tanδ) peak within a temperature range from 20° C. to 100° C., and the second TPU has a tanδ peak within a temperature range from −50° C. to 70° C.

Wherein based on a total weight of the first component, a content of the first TPU is 50% by weight or more;

the first TPU comprises a structural unit represented by Formula (I):

(I)

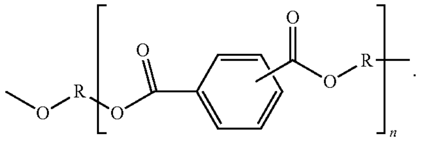

In Formula (I), each R independently is an alkylene group having 2 to 8 carbon atoms or $—CH_2CH_2OCH_2CH_2—$;

n is a number from 2 to 13; and the structural unit represented by Formula (I) has a number-average molecular weight (Mn) ranging from 700 grams per mole (g/mole) to 2500 g/mole.

By means of simultaneously comprising the first component and the second component which do not contain the exactly same TPU with each other and the first TPU included in the first component and the second TPU included in the second component respectively having a damping factor within a specific temperature range, the TPU self-crimping conjugate fiber of the present disclosure can exhibit self-crimpness; the extended appearance of each single filament is spiral, so said TPU self-crimping conjugate fiber has a fluffy appearance and can be applied to various knitting methods to produce soft fabrics with good elasticity and a comfortable feel since it is easy to knit. In addition, said fabrics are easy to recycle, so energy wastes and environmental impacts can be reduced, which is conducive to textile recycling and is more in line with the trend of sustainable development.

In accordance with the present disclosure, the tanδ peak of a component such as the first TPU and the second TPU may be obtained by the following measurement. First, a test piece of the component to be analyzed is formed by injection molding or hot press molding; wherein the test piece has a thickness of 2 millimeters (mm). Then, a dynamic mechanical analyzer (DMA) is used to measure at a fixed frequency of 1 Hertz (Hz) and calculate a function of changing temperature to obtain the tanδ versus temperature curve of the above-mentioned test piece, and the maximum value in this curve is just the tanδ peak. The higher the value of the tanδ peak, the greater the energy dissipation potential of the material. In addition, the area of the tanδ peak is related to the energy released during relaxation time.

Preferably, the tanδ peak of the first TPU may range from 0.5 to 1.5, but it is not limited thereto. More preferably, the tanδ peak of the first TPU may range from 0.68 to 1.5.

Preferably, the tanδ peak of the second TPU may range from 0.1 to 0.4, but it is not limited thereto. More preferably, the tanδ peak of the second TPU may range from 0.1 to 0.36.

Preferably, a difference between the tanδ peak of the first TPU and the tanδ peak of the second TPU may be 0.32 to 1.16. When the above conditions are met, the curly properties of the TPU self-crimping conjugate fiber will be more obvious.

Preferably, the first component may have a tanδ peak within a temperature range from 20° C. to 100° C., and the tanδ peak of the first component may range from 0.5 to 1.5, but it is not limited thereto. More preferably, the tanδ peak of the first component may range from 0.68 to 1.5

Preferably, the second component may have a tanδ peak within a temperature range from −50° C. to 70° C., and the tanδ peak thereof may range from 0.1 to 0.4, but it is not limited thereto. More preferably, the tanδ peak of the second component may range from 0.1 to 0.36.

Preferably, the TPU may comprise a structural unit represented by Formula (II):

(II)

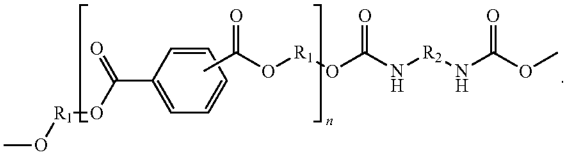

In Formula (II), each $R_1$ independently is an alkylene group having 2 to 8 carbon atoms or $—CH_2CH_2OCH_2CH_2—$;

$R_2$ is

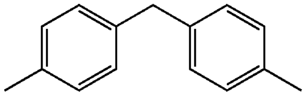

or

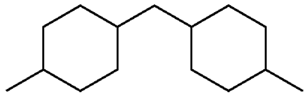

;

and n is a number from 2 to 13. In some embodiments, n may be an integer, but it is not limited thereto.

That is, $R_1$ in Formula (II) corresponds to R in Formula (I), and "n" in Formula (II) is the same as "n" in Formula (I).

Preferably, the Mn of the structural unit represented by Formula (I) may range from 1500 g/mole to 2500 g/mole, but it is not limited thereto.

Preferably, in the overall structural units of the TPU, the structural unit represented by Formula (I) may be in the range from 40 wt % to 80 wt %, but it is not limited thereto. More preferably, in the overall structural units of the TPU, the structural unit represented by Formula (I) may be in the range from 40 wt % to 60 wt %; for example, in some embodiments, the structural unit represented by Formula (I) may account for 45 wt %, 48 wt %, 50 wt % or 52 wt %.

Preferably, the first TPU may comprise the TPU of CAS No. 2484808-99-1, the TPU of CAS No. 2626937-63-9 or a combination thereof. "CAS No." is the abbreviation for Chemical Abstracts Service Number.

The TPU of CAS No. 2484808-99-1 comprises the structural unit represented by Formula (II) in which $R_1$ is $—CH_2CH_2OCH_2CH_2—$ and $R_2$ is

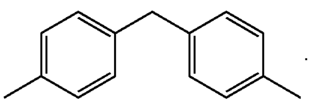
.

In addition, The TPU of CAS No. 2626937-63-9 comprises the structural unit represented by Formula (II) in which $R_1$ is $—(CH_2)_6—$ and $R_2$ is

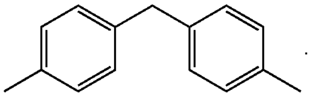
.

Or, the first TPU may be chosen from Kuotane® SK series TPU products available from Sunko Ink Co., LTD. Preferably, the first TPU may choose one from Kuotane® SK-D70 series TPU products, but it is not limited thereto.

It can be understood that the raw materials used to make the first TPU comprising the structural unit represented by Formula (I) may be made from conventional raw materials, as long as the structural units derived therefrom can conform to the structural unit represented by Formula (I).

In some embodiments, the first TPU may be obtained by addition polymerization which uses a diol with the dicarboxyphenyl polyester structure represented by Formula (I) and a diisocyanate as raw materials. In some other embodiments, the first TPU may be obtained by addition polymerization which uses a diol with the dicarboxyphenyl polyester structure represented by Formula (I), a chain extender and a diisocyanate as raw materials. In some other embodiments, the first TPU may be obtained by addition polymerization which uses a diol with the dicarboxyphenyl polyester structure represented by Formula (I), a chain extender, a diisocyanate, a polyol with chemically bound chromophores and an auxiliary as raw materials. In addition, the method of producing the first TPU can adopt the solvent-free one-shot synthesis method to undergo the addition polymerization, or the first TPU may be obtained by other methods such as described in the embodiments of TWI697512 B, but it is not limited thereto.

Specifically, the diol with the dicarboxyphenyl polyester structure represented by Formula (I) may be derived from a dicarboxyphenyl monomer and a diol monomer.

Preferably, the dicarboxyphenyl monomer may comprise 1,2-benzenedicarboxylic acid, 1,3-benzenedicarboxylic acid, 1,4-benzenedicarboxylic acid, phthalic anhydride or any combination thereof. Preferably, the diol monomer may comprise an aliphatic diol having 2 to 8 carbon atoms such as ethylene glycol, propylene glycol such as 1,2-propanediol and 1,3-propanediol, butanediol such as 1,4-butanediol, 2-methyl-1,3-propanediol, diethylene glycol, pentanediol, neopentyl glycol, hexanediol, 1,4-cyclohexanediol, 2-ethyl-1,3-hexanediol, 1,2-octanediol, 1,8-octanediol or any combination thereof.

Preferably, the diol with the dicarboxyphenyl polyester structure represented by Formula (I) may be selected from a group consisting of a polyester polyol of 1,2-phthalic acid/diethylene glycol (CAS No. 25916-41-0, the chemical formula is $(C_8H_6O_4{\cdot}C_4H_{10}O_3)_X$), a polyester polyol of phthalic anhydride/diethylene glycol (CAS No. 32472-85-8), a polyester polyol of 1,2-phthalic acid/diethylene glycol (CAS No. 25036-56-0, the chemical formula is $(C_{12}H_{12}O_5)_X$), a polyester polyol of 1,2-phthalic acid/1,6-hexanediol (CAS No. 27516-71-8, the chemical formula is $(C_8H_6O_4{\cdot}C_6H_{14}O_2)_X$), a polyester polyol of phthalic anhydride/1,6-hexanediol (CAS No. 54797-78-3), a polyester polyol of 1,2-phthalic acid/1,6-hexanediol (CAS No. 28725-71-5, the chemical formula is $(C_{14}H_{16}O_4)_X$) and any combination thereof.

Preferably, the diol with the dicarboxyphenyl polyester structure represented by Formula (I) may have a hydroxyl value (OH value) ranging from 160.3 mg KOH/g to 44.88 mg KOH/g, but it is not limited thereto. More preferably, the diol with the dicarboxyphenyl polyester structure represented by Formula (I) may have the OH value ranging from 74.8 mg KOH/g to 44.88 mg KOH/g. Preferably, the diol with the dicarboxyphenyl polyester structure represented by Formula (I) may have an acid value less than 1.0 mg KOH/g.

In accordance with the present disclosure, the diisocyanate may comprise methylene diphenyl diisocyanate (MDI), 4,4'-methylenebis(cyclohexyl isocyanate) (HMDI) or a combination thereof, but it is not limited thereto. Preferably, the diisocyanate may be MDI.

In accordance with the present disclosure, the chain extender may be an aliphatic diol. Preferably, the aliphatic diol may be a diol having 2 to 8 carbon atoms, but it is not limited thereto. For example, the aliphatic diol may be ethylene glycol, propylene glycol, butanediol such as 1,4-butanediol, 2-methyl-1,3-propanediol, diethylene glycol, pentanediol, neopentyl glycol, hexanediol, 1,4-cyclohexanediol, 2-ethyl-1,3-hexanediol, 1,2-octanediol, 1,8-octanediol or any combination thereof, but it is not limited thereto. More preferably, the chain extender may be 1,4-butanediol.

In accordance with the present disclosure, the polyol with chemically bound chromophores may be a polyether glycol with chemically bound chromophores, but it is not limited thereto. For example, the chromophore may be an anthraquinone-containing blue chromophore, an aromatic amino-containing red chromophore, or an aromatic amino-containing yellow chromophore, but it is not limited thereto. Preferably, the polyether glycol with chemically bound chromophores may have ends capped with hydroxyl groups. Preferably, based on a total weight of the raw materials of the first TPU, the usage of the polyether glycol with chemically bound chromophores may be from 0.05 wt % to 2.0 wt %. More preferably, based on the total weight of the raw materials of the first TPU, the usage of the polyether glycol with chemically bound chromophores may be from 0.15 wt % to 0.50 wt % such as 0.2 wt %, 0.3 wt % or 0.45 wt %, but it is not limited thereto. In the case of the raw material of the first TPU containing the polyol with chemically bound chromophores, the first TPU is a TPU resin having color itself.

In accordance with the present disclosure, the auxiliary may comprise an antioxidant, an anti-ultraviolet (UV) agent, a heat resistant agent, a lubricant, a catalyst, a pigment or any combination thereof, but it is not limited thereto.

In accordance with the present disclosure, the second TPU may be purchased directly from commercially-available products. For examples, the second TPU may adopt aliphatic polyester-based TPU products available from Sunko Ink Co., LTD. such as Urelon® K7681 series and Kuotane® K300 series, but it is not limited thereto. Or, the second TPU may adopt polyether-based TPU products available from Sunko Ink Co., LTD. such as Urelon® K370 series, Urelon® K398 series and Urelon® K38510 series, but it is not limited thereto. Or, the second TPU may be prepared from conventional raw materials, as long as the conventional raw materials do not derive the structure unit which can conform to the structural unit represented by Formula (I). In addition, the monomer used to synthesize the second TPU can come from petrochemical raw materials, biomass feedstock, or the materials from alcoholysis recovery, but it is not limited thereto.

Preferably, the second TPU may be a TPU which has a moiety derived from an aliphatic polyol, but it is not limited thereto. In some embodiments, the second TPU may be obtained by addition polymerization which uses an aliphatic polyol, a chain extender and a diisocyanate as raw materials. In some other embodiments, the second TPU may be obtained by addition polymerization which uses an aliphatic polyol, a chain extender, a diisocyanate and a polyol with chemically bound chromophores as raw materials. In some other embodiments, the second TPU may be obtained by addition polymerization which uses an aliphatic polyol, a chain extender, a diisocyanate, a polyol with chemically bound chromophores and an auxiliary as raw materials. In addition, the method of producing the second TPU may adopt a one-shot synthesis method to undergo the addition polymerization, but it is not limited thereto.

Preferably, the second TPU may adopt an aliphatic polyester glycol which is end-capped with a hydroxyl group; the aforesaid aliphatic polyester glycol may be derived from a diacid monomer and a diol monomer. Wherein, the diacid monomer may be butanedioic acid, pentanedioic acid, hexanedioic acid, heptanedioic acid, octanedioic acid, nonanedioic acid, decanedioic acid, dodecanedioic acid (DDDA) or any combination thereof, but it is not limited thereto. The diol may be ethylene glycol, propylene glycol such as 1,2-propanediol and 1,3-propanediol, butanediol such as 1,4-butanediol, 2-methyl-1,3-propanediol, diethylene glycol, pentanediol, neopentyl glycol, hexanediol, 1,4-cyclohexanediol, 2-ethyl-1,3-hexanediol, 1,2-octanediol, 1,8-octanediol or any combination thereof, but it is not limited thereto. Preferably, the aliphatic polyester glycol may be poly(1,4-butylene adipate) (PBA), poly(1,4-butylene ethylene adipate) (PEBA) or a combination thereof. Preferably, the aliphatic polyester glycol may have an OH value ranging from 160.3 mg KOH/g to 44.88 mg KOH/g, but it is not limited thereto. Preferably, the aliphatic polyester glycol may have an acid value less than 0.5 mg KOH/g. Preferably, the aliphatic polyester glycol may have a Mn ranging from 700 g/mole to 2500 g/mole, but it is not limited thereto.

In addition, the second TPU may adopt an aliphatic polyether glycol which is end-capped with a hydroxyl group. The aliphatic polyether glycol may be synthesized by a diol monomer which may be polypropylene glycol (PPG), polytetramethylene ether glycol (PTMEG) or a combination thereof, but it is not limited thereto. Preferably, the aliphatic polyether glycol may have a hydroxyl value ranging from 172.6 mg KOH/g to 56.1 mg KOH/g, but it is not limited thereto. Preferably, the aliphatic polyether glycol may have a Mn ranging from 650 g/mole to 2000 g/mole, but it is not limited thereto.

In accordance with the present disclosure, the diisocyanate, the chain extender, the polyol with chemically bound chromophores and/or the auxiliary used to synthesize the second TPU can refer to and independently select the above-mentioned raw materials that can be used in the first TPU.

Preferably, based on the total weight of the first component, the content of the first TPU may range from 60 wt % to 100 wt %, but it is not limited thereto. Accordingly, in the case that the content of the first TPU is less than 100 wt %, the first component may further contain a third TPU. Specifically, the third TPU is a TPU other than the first TPU; the third TPU may be the same as or different from the second TPU.

When the first component includes the first TPU and the third TPU simultaneously, the first TPU and the third TPU may be made into pellets by dry blending or melting and kneading with a kneader or an extruder. Preferably, the third TPU has an excellent compatibility with the first TPU. For example, the third TPU may be a TPU resin which has a moiety derived from an aliphatic polyester polyol, a TPU resin which has a moiety derived from an aliphatic polyether polyol, a TPU resin which has a moiety derived from an aliphatic polycaprolactone (PCL) polyol or a TPU resin which has a moiety derived from an aliphatic polycarbonate polyol, but it is not limited thereto.

In order to further improve the spinning processability of the TPU self-crimping conjugate fiber, preferably, the first TPU may have a surface softening-sticky temperature ranging from 85° C. to 200° C., but it is not limited thereto. More preferably, the first TPU may have the surface softening-sticky temperature ranging from 120° C. to 200° C. Preferably, the second TPU may have a surface softening-sticky temperature ranging from 85° C. to 200° C., but it is not limited thereto. More preferably, the second TPU may have the surface softening-sticky temperature ranging from 120° C. to 200° C. The surface softening-sticky temperature of a component such as the first component and the second component may be measured by the following method. For the component to be analyzed such as the first component or the second component, two identical test pieces thereof are prepared by injection molding, wherein the test pieces each have a thickness of 2 mm. Then, the two test pieces are stacked and placed in an oven for 20 minutes (min); after that, they are taken out to cool to room temperature, and then the degree of mutual adhesion between the two test pieces is observed. The temperature set for the oven starts from the temperature at which the two test pieces do not stick to each other, and gradually increases until a specific temperature at which the two test pieces appear to stick to each other and must be peeled apart by hand force exertion; therefore, the specific temperature is defined as the "surface softening-sticky temperature".

In some embodiments, in the TPU self-crimping conjugate fiber, a volume ratio of the first component to the second component may range from 3:7 to 7:3, but it is not limited thereto. For example, the volume ratio may be 4:6 or 5:5, but it is not limited thereto.

In accordance with the present disclosure, the TPU contained in the first component and the second component may adopt partially or completely recycled raw materials. In some embodiments, the raw material of the first component may fully be a direct recycled product of the TPU self-crimping conjugate fiber; or, in some other embodiments, the raw material of the first component may be 50 wt % of the direct recycled product of the TPU self-crimping conjugate fiber and 50 wt % of the virgin first TPU, but it is not limited thereto. In some embodiments, the second TPU of the second component may be a recycled material obtained by molten reprocessing TPU fibers which is without the first TPU, but it is not limited thereto.

Besides, taking convenience of recycling into consideration, the TPU self-crimping conjugate fiber may be made of only a combination of the first TPU and the second TPU. Therefore, it is beneficial for recycling or reusing the TPU self-crimping conjugate fiber from the waste products since the TPU self-crimping conjugate fiber does not have any plasticizers or any additives.

In accordance with the present disclosure, the TPU self-crimping conjugate fiber may have a monofilament structure or a multifilament structure. Preferably, the TPU self-crimping conjugate fiber may have the multifilament structure. In some embodiments, the multifilament structure may comprise 8 to 100 monofilaments, but it is not limited thereto. When the TPU self-crimping conjugate fiber may be in the form of the monofilament or in the multifilament each monofilament may have a cross section as described below.

In accordance with the present disclosure, the first component and the second component are separately fed and then hot-melted and extruded respectively. After metering, they are extruded from the same orifice of a spinneret in the molten state through the spin pack to form conjugate filaments (commonly referred to as "free-flow filament"). Conjugate fibers with different cross-sectional shapes can be prepared by using spinnerets with different orifice shapes. Accordingly, the cross section of the TPU self-crimping conjugate fiber (i.e. the section perpendicular to the longitudinal direction of the fiber) may have a regular or irregular shape. For example, the shape may be circle or non-circle such as oval, hollow, peanut-shaped (gourd-shaped; i.e. orthographic projection of two overlapping circles), triangle, rectangle, wedge, pentagon (star-shaped), hexagon, T-shaped and Y-shaped, but it is not limited thereto.

In accordance with the present disclosure, since the TPU self-crimping conjugate fiber contains the first component and the second component, it has at least two longitudinal (along the lengthwise direction of the fiber) co-extended areas, and the first region composed of the first component and the second region composed of the second component can adhere closely to each other. Specifically, in the cross section of the TPU self-crimping conjugate fiber, the distribution pattern of the first region and the second region may be in a side-by-side arrangement, a core-sheath arrangement, an islands-in-the-sea arrangement or a radial arrangement, but it is not limited thereto.

In a first embodiment, the cross section of each monofilament may be a circle and the distribution pattern of the first region and the second region is in a side-by-side arrangement; that is, each of the first region and the second region may be in an approximately semicircular shape, but it is not limited thereto.

In a second embodiment, the cross section of each monofilament may be peanut-shaped and the distribution pattern of the first region and the second region is in a side-by-side arrangement; that is, each of the first region and the second region may be in an approximately circular shape.

In a third embodiment, the cross section of each monofilament may be a circle and the distribution pattern of the first region and the second region is in a core-sheath arrangement which may be concentric core-sheath or eccentric core-sheath.

In accordance with the present disclosure, after the aforesaid conjugate fiber such as the conjugate filament is discharged from the orifice of the spinneret, it may be subjected to a drawing process or orientation process through the draw godet assembly to adjust the elongation of the TPU self-crimping conjugate fiber; for example, the elongation thereof may be in the range from 10% to 65%, or in the range of greater than 65% and less than or equal to 140%, but it is not limited thereto. Next, the stretched composite filament is wound on a bobbin at a winding rate from 600 meters per minute (m/min) to 4000 m/min to obtain a drawn yarn of the TPU self-crimping conjugate fiber. In some embodiments, when the drawn yarn is unwound from the bobbin, it can take on a curled shape. Or, after the drawn yarn is unwound from the bobbin, two or more of the drawn yarns may be plied to perform a secondary processing such as stretching, false twist deformation processing and air-jet texturing processing, and finally a bulk textured yarn can be obtained; wherein the bulk textured yarn can have a higher elastic recovery than that of the drawn yarn.

In some embodiments, in the case that the TPU self-crimping conjugate fiber has the multifilament structure, preferably, each filament in the multifilament may have a fineness from 2 deniers (D) to 10 D, but it is not limited thereto. More preferably, each filament in the multifilament may have a fineness from 3 D to 8.5 D.

In some embodiments, in the case that the TPU self-crimping conjugate fiber has the multifilament structure, preferably, the TPU self-crimping conjugate fiber may have a crimp contraction after being boiled in a water bath for 5 min at a temperature of 97° C. or above ranging from 3.9% to 20%, but it is not limited thereto.

In some embodiments, in the case that the TPU self-crimping conjugate fiber has the multifilament structure, preferably, each monofilament from the multifilament should show a spiral which contains regular cycles, and the number of cycles per unit length may be 12 to 40 per centimeter, but it is not limited thereto.

The instant disclosure further provides a fabric which comprises the aforesaid TPU self-crimping conjugate fiber.

In some cases, the fabric is essentially composed of the aforesaid TPU self-crimping conjugate fiber.

In some embodiments, the fabric may be made by weaving or knitting, but it is not limited thereto. Specifically, the knitting may be flat knitting or circular knitting, but it is not limited thereto.

The fabric may be used to make clothing, socks, scarves, bags, fashion accessories, shoe uppers and so on, but it is not limited thereto. In some embodiments, the fabric may also be applied to making covers for personal protective equipment, but it is not limited thereto.

In this specification, unless otherwise particularly specified, said "TPU self-crimping conjugate fiber" may be fiber with a monofilament structure, fiber with a multifilament structure, fiber in a virgin-filament type, fiber in an undrawn type, fiber in a drawn-yarn type and/or fiber in various textured-yarn types.

In this specification, a range represented by "a lower-endpoint value to an upper-endpoint value", unless otherwise particularly specified, indicates that the range is more than or equal to the lower-endpoint value and less than or equal to the upper-endpoint value. For example, the Mn ranging from 700 g/mole to 2500 g/mole indicates that the Mn is "more than or equal to 700 g/mole and less than or equal to 2500 g/mole".

Other objectives, advantages and novel features of the disclosure will become more apparent from the following detailed description when taken in conjunction with the accompanying drawings.

DETAILED DESCRIPTION OF THE PREFERRED EMBODIMENTS

Figure 1:
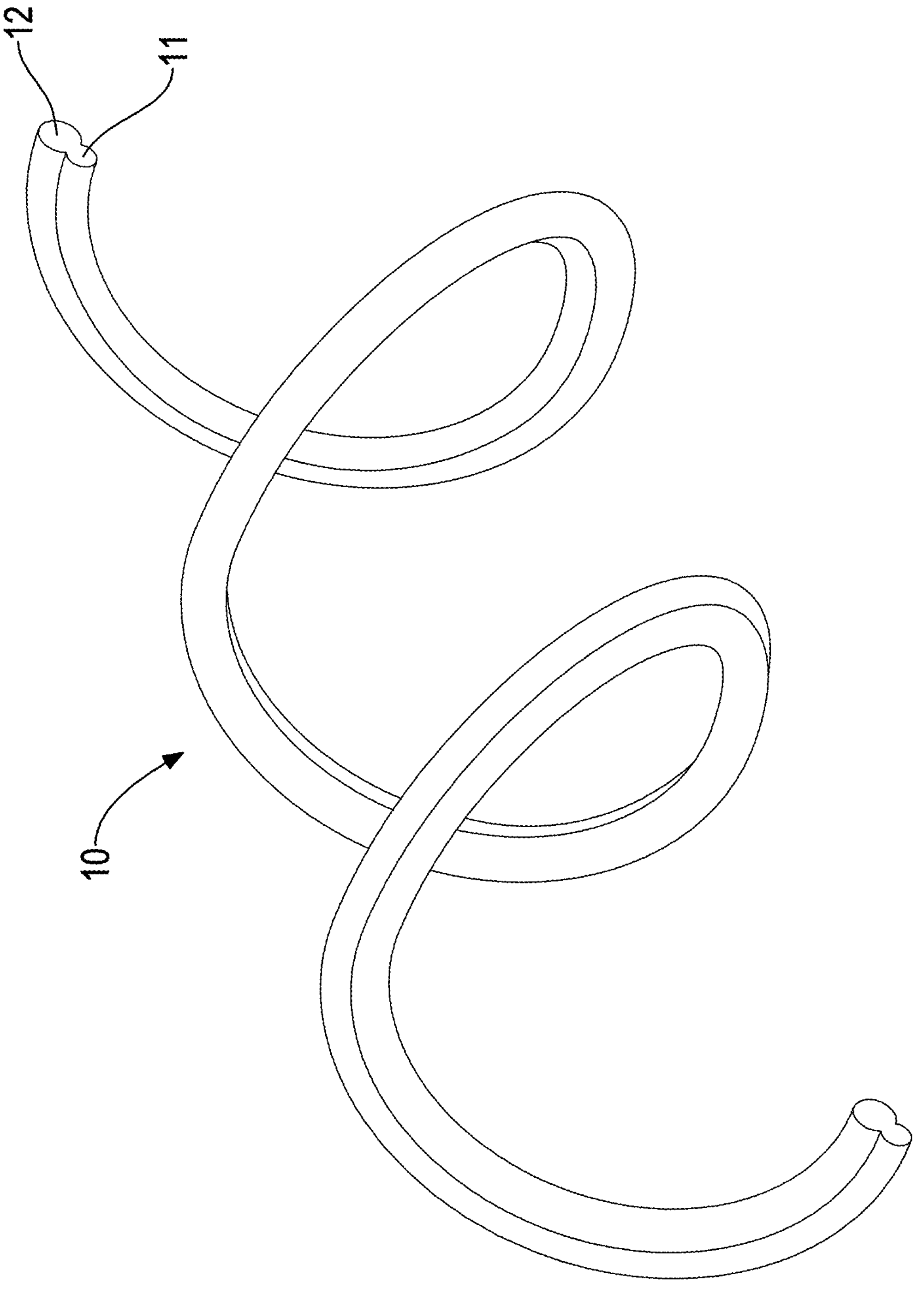
FIG. 1 is a schematic perspective view of one embodiment of the TPU self-crimping conjugate fiber of the present disclosure.

Hereinafter, one skilled in the arts can easily realize the advantages and effects of the present disclosure from the following examples and comparative examples. Therefore, it should be understood that the descriptions proposed herein are just preferable examples for the purpose of illustrations only, not intended to limit the scope of the disclosure. Various modifications and variations could be made in order to practice or apply the present disclosure without departing from the spirit and scope of the disclosure.

《First Component》

The first TPU included in the first component could be directly purchased from commercially-available products or could be prepared by adopting the synthetic method recorded in TW1697512B or other conventional synthetic methods.

1. TPU 1-1: Kuotane® SK-D70 of Sunko Ink Co., LTD.; wherein the appearance thereof was a transparent pellet in light yellow color; wherein it was prepared by the solvent-free one-shot synthesis method adopting the polyester polyol of phthalic anhydride/1,6-hexanediol, 1,4-butanediol, MDI and the auxiliary.
2. TPU 1-2: Kuotane® SK-D70B of Sunko Ink Co., LTD.; wherein the appearance thereof was a transparent pellet in lake blue color; wherein it was prepared by the solvent-free one-shot synthesis method adopting the polyester polyol of phthalic anhydride/1,6-hexanediol, 1,4-butanediol, the polyol with chemically bound aminoanthraquinone-containing blue chromophores, MDI and the auxiliary.
3. TPU 1-3: Kuotane® SK6023 of the meltblown TPU product of Sunko Ink Co., LTD.; wherein the appearance thereof was a transparent pellet in light yellow color; wherein it was prepared by the solvent-free one-shot synthesis method adopting the polyester polyol of phthalic anhydride/diethylene glycol, 1,4-butanediol, MDI and the auxiliary.
4. TPU 1-4: a dry blending mixture of said TPU 1-3 pellets and the below-described TPU 2-1 (equal to a third TPU); wherein a weight ratio of TPU 1-3 to TPU 2-1 was 60:40.
5. TPU 1-5: a dry blending mixture of said TPU 1-1 pellets and the below-described TPU 2-1 (equal to a third TPU); wherein a weight ratio of TPU 1-1 to TPU 2-1 was 60:40.
6. TPU 1-6: a dry blending mixture of said TPU 1-2 pellets and the below-described TPU 2-1 (equal to a third TPU); wherein a weight ratio of TPU 1-2 to TPU 2-1 was 60:40.
7. TPU 1-7: a dry blending mixture of said TPU 1-1 pellets and the below-described TPU 2-5 (equal to a third TPU); wherein a weight ratio of TPU 1-1 to TPU 2-5 was 60:40.

《Second Component》

The second TPU included in the second component could be directly purchased from commercially-available products or could be prepared by adopting any conventional synthetic method. The second TPU listed below belonged to the TPU which had a moiety derived from an aliphatic polyol.

1. TPU 2-1: Urelon® K7681BVM of Sunko Ink Co., LTD.; wherein the appearance thereof was a nearly colorless and transparent pellet; wherein it was prepared by the solvent-free one-shot synthesis method adopting PBA, 1,4-butanediol, MDI and the auxiliary.
2. TPU 2-2: Urelon® K7681BVMR of Sunko Ink Co., LTD.; wherein the appearance thereof was a transparent red pellet; wherein it was prepared by the solvent-free one-shot synthesis method adopting PBA, 1,4-butanediol, the polyol with chemically bound aromatic amino-containing red chromophores, MDI and the auxiliary. Wherein, the injection-molded sheet made thereby was analyzed with a UV/visible light spectrometer, and the analyzing result showed that it had a characteristic absorption peak at a wavelength of 526 nanometers (nm).
3. TPU 2-3: Urelon® K7681BVMB of Sunko Ink Co., LTD.; wherein the appearance thereof was a transparent pellet in lake blue color; wherein it was prepared by the solvent-free one-shot synthesis method adopting PBA, 1,4-butanediol, the polyol with chemically bound aminoanthraquinone-containing blue chromophores, MDI and the auxiliary. Wherein, the injection-molded sheet made thereby was analyzed with a UV/visible light spectrometer, and the analyzing result showed that it had a characteristic absorption peak at a wavelength of 628 nm.

4. TPU 2-4: Kuotane® K300 of Sunko Ink Co., LTD.; wherein the appearance thereof was a colorless translucent pellet; wherein it was prepared by the solvent-free one-shot synthesis method adopting PEBA, 1,4-butanediol, MDI and the auxiliary.
5. TPU 2-5: Urelon® K370VM of Sunko Ink Co., LTD.; wherein the appearance thereof was a translucent pellet in light yellow color; wherein it was prepared by the solvent-free one-shot synthesis method adopting PTMEG, 1,4-butanediol, MDI and the auxiliary.
6. TPU 2-6: Urelon® K398VM of Sunko Ink Co., LTD.; wherein the appearance thereof was a translucent pellet in light yellow color; wherein it was prepared by the solvent-free one-shot synthesis method adopting PTMEG, 1,4-butanediol, MDI and the auxiliary.
7. TPU 2-7: Urelon® K38510 VMC of Sunko Ink Co., LTD.; wherein the appearance thereof was a nearly colorless and transparent pellet; wherein it was prepared by the solvent-free one-shot synthesis method adopting PTMEG, 1,4-butanediol, MDI and the auxiliary.
8. TPU 2-8: light brown pellets made through a series of steps comprising washing, press drying and melting granulating from a recycled material of the melt-spun fibers (multifilament type); wherein the melt-spun fibers were made from Urelon® K7681BVM.

Analysis 1: Physical Property Tests of the First Component/Second Component and the Adopted Methods The test pieces injection-molded from TPU 1-1 to TPU 1-7 as the first component and the test pieces injection-molded from TPU 2-1 to TPU 2-8 as the second component were respectively analyzed by the same method described below for mechanical characteristics at room temperature including Shore hardness, tensile strength, elongation at break, elasticity coefficient, modulus at 100% elongation and modulus at 300% elongation, and mechanical characteristics at 70° C. including tensile strength, elongation at break, modulus at 100% elongation and modulus at 300% elongation. Those results were listed in Table 1 and Table 2.

In order to ensure the experimental significance and validity of the characteristic analysis, each group of test pieces was made with the same injection molding machine (model: YC V-90 from Year-Chance Machinery Co. Ltd.), and the thickness of each test piece was 2 mm. In addition, TPU pellets of each group were dried until its water content reached below 0.05 wt %, and then the TPU pellets were put into the feed hopper. The injection molding machine had five heating zones with a set injection temperature of 180° C. to 220° C.; the length/diameter ratio (L/D) of the screw was 22/1; the size of the mold was 120 mm×120 mm×2 mm, and the mold temperature was 25° C. to 30° C. Therefore, it can be understood that the difference in characteristics among those test pieces was mainly caused by the difference in the composition of the raw material thereof.

Methods for Analyzing Mechanical Characteristics:

1. Shore hardness: measured in accordance with the standard method ASTM D1238.
2. Tensile strength: measured in accordance with the standard method JIS K7311 at 23±2° C. and 70° C.
3. Elongation at break: measured in accordance with the standard method JIS K7311 at 23±2° C. and 70° C.
4. Elasticity coefficient: measured in accordance with the standard method JIS K7311 at 23±2° C.
5. Modulus at 100% elongation: measured in accordance with the standard method JIS K7311 at 23±2° C. and 70° C.
6. Modulus at 300% elongation: measured in accordance with the standard method JIS K7311 at 23±2° C. and 70° C.

In addition, under the test conditions of a fixed frequency of 1 Hz and an angular frequency of 6.28 rad/s, a DMA with a dual cantilever was used to respectively scan the storage modulus (represented as E') and loss modulus (represented as E") of the above-mentioned test pieces of TPU 1-1 to TPU 1-7 and TPU 2-1 and TPU 2-8 in the temperature range of −100° C. to 100° C. Also, the damping factor which is a ratio of E' to E" (represented as tanδ) of each test piece was calculated. The peak value of E' and the temperature corresponding thereto and the peak value of tanδ and the temperature corresponding thereto for each test piece were listed in Table 1 and Table 2.

TABLE 1 mechanical characteristics, peak value of storage modulus E' and temperature, peak value of Tanδ and temperature of TPU 1-1 to TPU 1-7

| | TPU 1-1 | TPU 1-2 | TPU 1-3 | TPU 1-4 | TPU 1-5 | TPU 1-6 | TPU 1-7 |
|---|---|---|---|---|---|---|---|
| Shore hardness @23° C. | 77D | 78D | 70D | 59D | 71D | 64D | 66D |
| Tensile strength @23° C. ($kgf/cm^2$) | 398 | 432 | 452 | 262 | 296 | 339 | 358 |
| Elongation at break @23° C. (%) | 73.2 | 24.0 | 20.0 | 475 | 452 | 486 | 470 |
| Elasticity coefficient @23° C. ($kgf/cm^2$) | 8970 | 8335 | — | 2992 | 7521 | 3533 | 5696 |
| 100% modulus @23° C. ($kgf/cm^2$) | — | — | — | 193 | 273 | 276 | 302 |
| 300% modulus @23° C. ($kgf/cm^2$) | — | — | — | 230 | 264 | 303 | 326 |

TABLE 1-continued mechanical characteristics, peak value of storage modulus E' and temperature, peak value of Tanδ and temperature of TPU 1-1 to TPU 1-7

| | | TPU 1-1 | TPU 1-2 | TPU 1-3 | TPU 1-4 | TPU 1-5 | TPU 1-6 | TPU 1-7 |
|---|---|---|---|---|---|---|---|---|
| Tensile strength @70° C. (kgf/cm$^2$) | | 218 | 111 | 82.2 | 143 | 208 | 213 | 250 |
| Elongation at break @70° C. (%) | | 736 | 588 | 723 | 679 | 490 | 386 | 382 |
| 100% modulus @70° C. (kgf/cm$^2$) | | 103 | 54.9 | 35.6 | 57.4 | 92.5 | 90.8 | 117 |
| 300% modulus @70° C. (kgf/cm$^2$) | | 133 | 68.1 | 50.3 | 77.9 | 114 | 113 | 137 |
| E' | Peak (MPa) | 297.9 | 451.1 | 82.9 | 187.6 | 270.1 | 193.3 | 200.9 |
| | Temp. (° C.) | 47.9 | 41.7 | 40.8 | 21.8 | 39.8 | 35.3 | 42.2 |
| Tanδ | Peak | 1.117 | 0.684 | 1.394 | 0.727 | 0.755 | 0.698 | 0.738 |
| | Temp. (° C.) | 59.3 | 59.8 | 53.8 | 45.4 | 52.4 | 50.0 | 52.8 |

TABLE 2 mechanical characteristics, peak value of storage modulus E' and temperature, peak value of Tanδ and temperature of TPU 2-1 to TPU 2-8

| | | TPU 2-1 | TPU 2-2 | TPU 2-3 | TPU 2-4 | TPU 2-5 | TPU 2-6 | TPU 2-7 | TPU 2-8 |
|---|---|---|---|---|---|---|---|---|---|
| Shore hardness @23° C. | | 70D | 70D | 60D | 88A | 74D | 98A | 88A | 60D |
| Tensile strength @23° C. (kgf/cm$^2$) | | 404 | 593 | 376 | 225 | 333 | 337 | 295 | 358 |
| Elongation at break @23° C. (%) | | 531 | 527 | 529 | 715 | 402 | 590 | 748 | 560 |
| Elasticity coefficient @23° C. (kgf/cm$^2$) | | 3643 | 2693 | 4676 | 210 | 288 | 791 | 246 | 1082 |
| 100% modulus @23° C. (kgf/cm$^2$) | | 245 | 348 | 234 | 61.3 | 219 | 135 | 68.7 | 220 |
| 300% modulus @23° C. (kgf/cm$^2$) | | 310 | 447 | 303 | 97.5 | 282 | 195 | 97.1 | 284 |
| Tensile strength @70° C. (kgf/cm$^2$) | | 246 | 346 | 234 | — | 280 | 83 | 96.2 | 215 |
| Elongation at break @70° C. (%) | | 646 | 701 | 684 | — | 236 | 210 | 691 | 654 |
| 100% modulus @70° C. (kgf/cm$^2$) | | 104 | 137 | 101 | — | 116 | 83 | 48.4 | 102 |
| 300% modulus @70° C. (kgf/cm$^2$) | | 132 | 210 | 136 | — | — | — | 62.6 | 128 |
| E' | Peak (MPa) | 178.6 | 187.6 | 200.9 | 209.3 | 121.7 | 141.7 | 189.3 | 181.0 |
| | Temp. (° C.) | 20.1 | 21.8 | 16.2 | −39.7 | 22.2 | −10.9 | −39.0 | 25.1 |
| Tanδ | Peak | 0.305 | 0.321 | 0.300 | 0.294 | 0.277 | 0.233 | 0.316 | 0.361 |
| | Temp. (° C.) | 44.3 | 50.4 | 43.7 | −24.1 | 58.4 | 30.4 | −16.5 | 59.8 |

Analysis 2: The Surface Softening-Sticky Temperature of the First Component and the Second Component In each group, multiple test pieces of TPU 1-1 to TPU 1-7 and TPU 2-1 to TPU 2-8 were respectively formed according to the above-mentioned injection molding for each group. Next, two identical test pieces from each group were taken to stack and obtain a laminated structure in each group. The laminated structures then were placed in an oven, heated to a set temperature and kept at that temperature for 20 min. After that, the laminated structures were respectively taken out and cooled at a room temperature, and then the degree of mutual adhesion between the two test pieces in the laminated structure of each group was tested and observed.

(1) In the case that the two test pieces could be separated without applying force or only with slight force, it was determined that the group of TPU was not mutually sticky at that set temperature.

(2) The set temperature of the oven was increased in steps of 10° C. each time until the adhesion of the two test pieces in the laminated structure required force to prise apart; accordingly, this set temperature was regarded as a specific temperature recorded as T1 (i.e. surface softening-sticky temperature).

(3) After the stage (2), the set temperature of the oven was continuously increased in steps of 5° C. each time until the adhesion of the two test pieces in the laminated structure was inseparable by hand; accordingly, this set temperature was recorded as T2. T1 and T2 of each group were listed in Table 3.

Analysis 3: Continuity and Stickiness of Monofilament

The test pieces of TPU 1-1 to TPU 1-7 and TPU 2-1 to TPU 2-8 were each weighed 5 g and respectively put into the sample chamber of a melt flow indexer, and the set temperature which was selected from a temperature range between 190° C. and 230° C. to allow the strip to flow out smoothly was kept stably for 6 min. Then, a load weighted 8.7 kilograms (kg) was applied for 1 min, followed by opening the valve to allow each TPU strip to flow out from the die hole and spinning the obtained TPU strip by negative pressure to obtain the resulting monofilament; wherein the diameter of the die hole was 1 mm. The criteria for judging the continuity and the stickiness of the monofilament of the first component and the second component were described as follows.

Continuity: during the process of pulling out TPU strip by negative pressure, in the situation that the TPU strip drooped down when pulled out and could not be drawn smoothly or the process was interrupted, the continuity of said TPU was judged as "fail" denoted as "X". On the other hand, in the situation that the pulling process for the TPU strip was continuous, the continuity of said TPU was judged as "pass"; wherein the result of "pass" could be further divided into two levels according to the smoothness of drawing: the level of "good" denoted as "○", and the level of "excellent" denoted as "◎".

Stickiness of the monofilament: in the situation that the monofilament obtained by the above-mentioned pulling was sticky or even difficult to separate during the natural cooling process at the die aperture, and the resulting monofilament was uneasily collected, the stickiness of said monofilament of said TPU was judged as "easy to stick". On the other hand, in the situation that the resulting monofilament was not sticky and easy to separate apart, the stickiness of monofilament of said TPU was judged as "not easy to stick"; wherein the result of "not easy to stick" could be further divided into two levels according to the ease of collection of the monofilament: the level of "good" denoted as "○", and the level of "excellent" denoted as ◎.

TABLE 3 analytic results of surface softening-sticky temperature, continuity and stickiness of TPU 1-1 to TPU 1-7 for the first component and TPU 2-1 to TPU 2-8 for the second component

| TPU No. for the first component/ TPU No. of the second component | Surface softening-sticky temperature T1-T2 (° C.) | Continuity | Stickiness |
|---|---|---|---|
| TPU 1-1 | 140-145 | ◎ | ◎ |
| TPU 1-2 | 120-130 | ◎ | ○ |
| TPU 1-3 | 105-110 | ○ | Easy to stick |
| TPU 1-4 | 125-130 | ◎ | ○ |
| TPU 1-5 | 140-145 | ◎ | ◎ |
| TPU 1-6 | 140-145 | ◎ | ◎ |
| TPU 1-7 | 160-165 | ◎ | ◎ |
| TPU 2-1 | 150-155 | ◎ | ◎ |
| TPU 2-2 | 150-155 | ◎ | ◎ |
| TPU 2-3 | 150-155 | ◎ | ◎ |
| TPU 2-4 | 125-130 | ◎ | ○ |
| TPU 2-5 | 195-200 | ◎ | ◎ |
| TPU 2-6 | 150-155 | ◎ | ○ |
| TPU 2-7 | 140-145 | ◎ | ○ |
| TPU 2-8 | 150-155 | ○ | ◎ |

Analysis 4: Preliminary Analysis of Compatibility and Curlability

Two kinds of the different TPU pellets were selected from TPU 1-1 to TPU 1-7 and TPU 2-1 to TPU 2-8 with a predetermined weight ratio according to Table 4 to be subjected to dry blending. Then, 5 g of the dry blending mixture of each group was taken and put into the sample chamber of a melt flow indexer, and the set temperature which was selected from a temperature range between 190° C. and 230° C. to allow each strip to flow out smoothly was kept stably for 6 min. Then, the 8.7 kg of load was applied for 1 min, followed by opening the valve to allow the TPU strip to flow out from the die hole and pulling out the obtained TPU strip by negative pressure to obtain the resulting monofilament; wherein the diameter of the die hole was 1 mm. The criteria for judging the compatibility of the monofilament and the curlability of the monofilament at the instant moment after stretching followed by releasing, at the timing 4 hours (H) after releasing and at the timing 16 H after releasing were described as follows.

Compatibility: in the case that the surface of the strip was damaged, the pellets had not been molten or scorched, the compatibility of the group would be judged as "fail" denoted as "X". On the other hand, in the case that the surface of the strip or the obtained monofilament was smooth and uniform, the compatibility of the group would be judged as "pass"; wherein the result of "pass" could be further divided into three levels according to the smoothness and uniformity of said surface: the level of "fair" denoted as "Δ", the level of "good" denoted as "○", and the level of "excellent" denoted as "◎".

Curlability: a section with the length of 3 cm of the obtained monofilament of each group was cut out as the test sample, and said test sample was stretched to 7.5 cm by hand and then released at room temperature; then the form of said test sample was observed and recorded in Table 4. In the case that the test sample showed a smooth straight line at the instant moment after releasing, it was judged as "fail" denoted as "XX". On the other hand, when the test sample showed a coiled shape at the instant moment after releasing, the curly degree (i.e. curl maintenance) of the appearance was observed at three timings: (1) the instant moment after releasing; (2) 4 hours after releasing and maintaining; (3) 16 hours after releasing and maintaining. Specifically, if it was a smooth straight line, it should be judged as "fail" denoted as "XX"; if there was almost no curve, it also should be judged as "fail" denoted as "X"; if the test sample still maintained crimping, it should be judged as "pass". Wherein the result of "pass" could be further divided into three levels according to the curl degree of said test sample: the level of "slightly curly" denoted as "Δ", the level of "curly" denoted as "○", and the level of "obvious curly" denoted as "◎".

bly and the peripheral equipment of the Taiwan Textile Research Institute, including two melt spinning extruders (represented by A and B), both of which were connected to the conjugate spinneret assembly; wherein the first component was chosen from TPU 1-1 to TPU 1-7 and the first component was fed into melt Spinning extruder A, and the TPU of the second component was chosen from TPU 2-1 to TPU 2-8, and the second component was fed into melt Spinning extruder B. The above-mentioned TPU pellets all needed to be fully dried before feeding the hopper of each

TABLE 4 combination of the TPU No. in the first component and the TPU No. in the second component and the weight ratio thereof in each group, the analytic results of compatibility and curlability of each group

| Group No. | TPU No. of the first component | TPU No. of the second component | Weight ratio thereof | Compatibility | Curlability Instant | Curlability 4 H | Curlability 16 H |
|---|---|---|---|---|---|---|---|
| 1 | TPU 1-1 | TPU 2-1 | 4:6 | ◎ | ◎ | ◎ | ◎ |
| 2 | TPU 1-2 | TPU 2-1 | 4:6 | ◎ | ◎ | ◎ | ◎ |
| 3 | TPU 1-3 | TPU 2-1 | 4:6 | ◎ | ◎ | ◎ | ◎ |
| 4 | TPU 1-4 | TPU 2-1 | 5:5 | ◎ | ○ | ○ | ○ |
| 5 | TPU 1-5 | TPU 2-1 | 5:5 | ◎ | ○ | Δ | Δ |
| 6 | TPU 1-6 | TPU 2-1 | 4:6 | ◎ | ○ | ○ | Δ |
| 7 | TPU 1-7 | TPU 2-5 | 4:6 | ◎ | ◎ | ◎ | ○ |
| 8 | TPU 1-1 | TPU 2-4 | 5:5 | ◎ | ◎ | ◎ | ◎ |
| 9 | TPU 1-1 | TPU 2-5 | 5:5 | ◎ | ◎ | ◎ | ◎ |
| 10 | TPU 1-2 | TPU 2-5 | 5:5 | ◎ | ◎ | ◎ | ◎ |
| 11 | TPU 1-1 | TPU 2-6 | 5:5 | ◎ | ◎ | ◎ | ○ |
| 12 | TPU 1-1 | TPU 2-7 | 4:6 | ◎ | ◎ | ◎ | ◎ |
| 13 | TPU 1-2 | TPU 2-7 | 4:6 | ◎ | ◎ | ◎ | ◎ |
| 14 | TPU 1-1 | TPU 2-8 | 4:6 | ◎ | ◎ | ◎ | ○ |
| 15 | TPU 1-1<br>TPU 1-2 | — | 5:5 | ◎ | XX | XX | XX |
| 16 | — | TPU 2-1<br>TPU 2-2 | 5:5 | ◎ | XX | XX | XX |
| 17 | — | TPU 2-1<br>TPU 2-5 | 5:5 | ◎ | ○ | Δ | X |
| 18 | — | TPU 2-5<br>TPU 2-6 | 5:5 | ◎ | ○ | Δ | X |

《TPU Self-Crimping Conjugate Fiber》

Preparation of Drawn-Yarn Type of TPU Self-Crimping Conjugate Fiber (Multifilament Structure)

Figure 2:
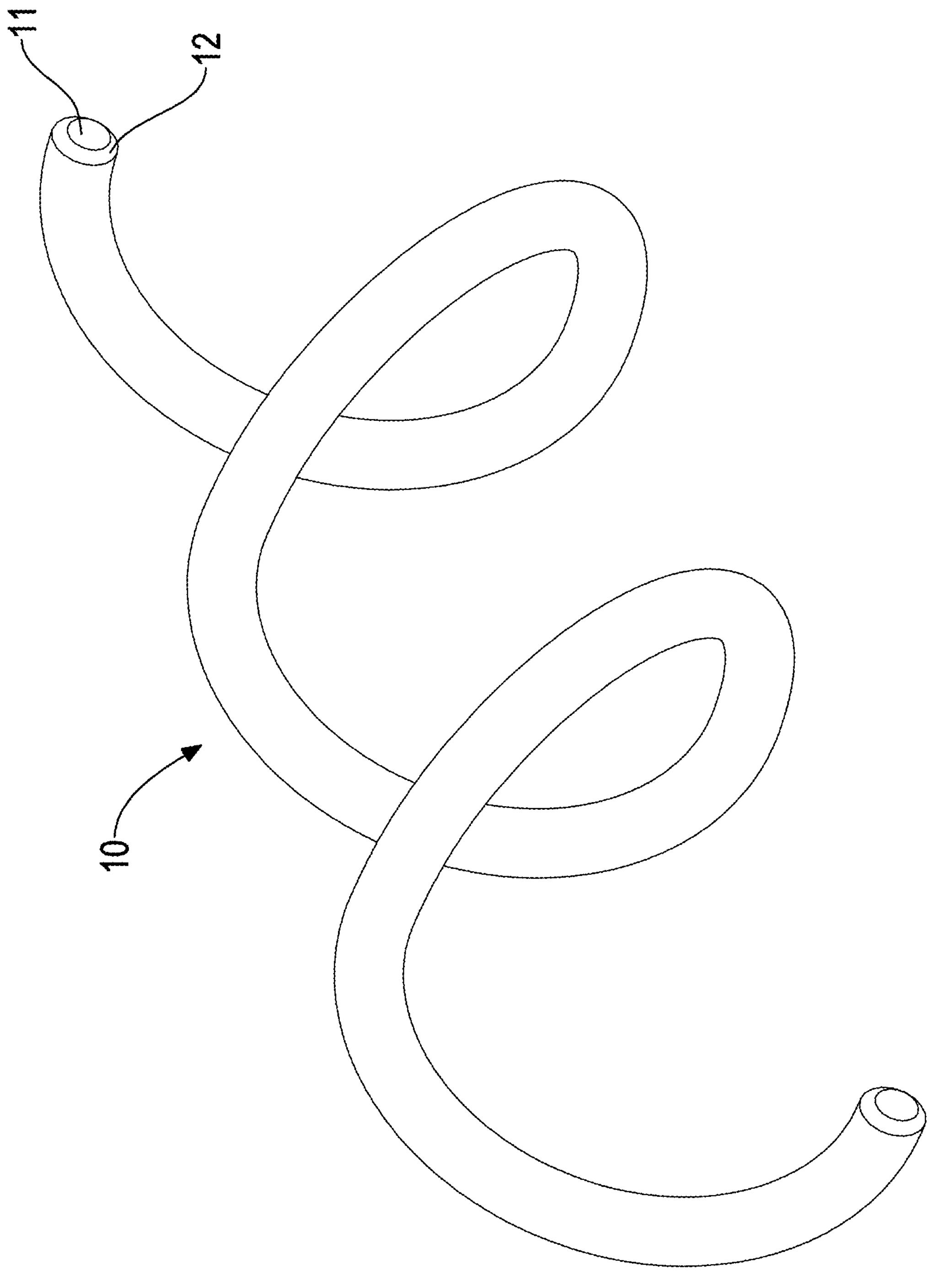
FIG. 2 is a schematic perspective view of another embodiment of the TPU self-crimping conjugate fiber of the present disclosure.

The present disclosure provides a TPU self-crimping conjugate fiber. The monofilament structure of the TPU self-crimping conjugate fiber or a single filament among the multifilament structure could be shown in FIG. 1 and FIG. 2. Each monofilament 10 roughly shows a continuous spiral along the lengthwise direction of the fiber. Specifically, the cross section of each monofilament 10 (i.e. the section perpendicular to the longitudinal direction) depends on the orifice shape of the selected spinneret. For example, as shown in FIG. 1, the cross section of the monofilament 10 is approximately peanut-shaped; wherein, the cross section includes a first region 11 composed of the first component and a second region 12 composed of the second component, and the first region 11 and the second region 12 are distributed in a side-by-side type and adhered together. Besides, as shown in FIG. 2, the cross section of the monofilament 10 is approximately circular; wherein, the cross section includes a first region 11 composed of the first component and a second region 12 composed of the second component, and the first region 11 and the second region 12 are distributed in a core-sheath type and adhered together.

The following TPU self-crimping conjugate fibers of Examples were prepared by the conjugate spinneret assembly melt spinning extruder, so that the water content thereof was 0.02 wt % or below, or even 0.01 wt % or below.

The conjugate spinneret assembly had three specifications; wherein Examples 1 to 5 (E1 to E5) were applied "Assembly C" which had 24 holes, the L/D of the spinneret being 0.6 mm/0.2 mm; and each monofilament therein would be side-by-side type. Example 6 (E6) was applied "Assembly D" which had 36 holes, the L/D of the spinneret being 0.5 mm/0.25 mm; and each monofilament therein would be eccentric core-sheath type with a degree of eccentricity of 30°, and the first component as the sheath part and the second component as the core part. Examples 7 to 10 (E7 to E10) and Example 19 (E19) were applied "Assembly E" which had 24 holes, the L/D of the spinneret being 1.05 mm/0.35 mm; and each monofilament therein would be side-by-side type. Examples 11A to 11C (E11A to E11C) were applied "Assembly C" which had holes, the L/D of the spinneret being 0.6 mm/0.2 mm; and each monofilament therein would be side-by-side type. Examples 12A and 12B (E12A and 12B) were applied "Assembly D" which had 36 holes, the L/D of the spinneret being 0.5 mm/0.25 mm; and each monofilament therein would be eccentric core-sheath type with a degree of eccentricity of 30°, and the first component as the core part and the second component as the sheath part.

The following TPU self-crimping conjugate fibers of Comparative Examples 1 and 2 (C1 and C2) were prepared by the single spinneret assembly and the peripheral equipment of the Taiwan Textile Research Institute, including one melt spinning extruder (i.e. the above-mentioned Spinning extruder A), which was connected to the conjugate spinneret assembly (Assembly F, optional one set or two sets). The specification of Assembly F was 24 holes; the L/D of the spinneret being 0.6 mm/0.3 mm.

During the operation of Spinning extruder A and Spinning extruder B, it was necessary to set the four-section heating temperature of the screw, the temperature of the transfer zone and the temperature of the spinning box, and those temperatures could be adjusted according to the spinning pressure that the equipment could withstand and the condition of TPU melting and spinning. The temperatures of Spinning extruder A and Spinning extruder B were respectively set between 180° C. and 245° C., preferably from 200° C. to 235° C. The temperatures adopted in each group were listed in Tables 5-1 to 5-3.

The feeding volume ratio of the first component to the second component could be controlled by the pump speeds of Spinning extruders A and B. In addition, owing to passing through the spinning assembly, the conjugate fibers of each group may pass through the silicon-containing water-based lubricant for reducing friction.

Wherein the TPU self-crimping conjugate fibers of Examples 1 to 10 and 19 were stretched by five temperature-controlled draw godet rollers, and said five draw godet rollers were represented as GR1, GR2, GR3, GR4, and GR5 respectively. In the drawing or orienting process, the speed and temperature of each draw godet roller could be slightly adjusted according to the smoothness of the drawing. The temperature of the draw godet rollers was usually set between room temperature and 140° C.; wherein the temperatures of GR2 and GR3 in each group were recorded in Table 5-1 to Table 5-3. The speed of the godet roller usually could be set from 600 m/min to 4000 m/min, preferably from 700 m/min to 3000 m/min, and the speeds of GR1 to GR5 adopted in each group were recorded in Table 5-1 to Table 5-3. In addition, the draw ratio was defined by the value from the speed of GR5 divided by the speed of GR2. Besides, without drawing, the TPU self-crimping conjugate fibers of Examples 11A to 11C, 12A and 12B were in the form of free-flow filament.

The speed of the winding machine was usually set from 2000 m/min to 3000 m/min. The speed of the winding machine adopted in each group was adjusted according to the tension of the filament before entering the winding machine and the condition of winding the filament on the bobbin tube. The specific conditions were recorded in Table 5-1 to Table 5-3. The bobbin tube was a paper tube, and the collecting fluency of each group was evaluated by observing the performance of winding filaments on the paper tube.

Analysis 5: Spinnability

In the case that the overall appearance of the wound filament on the paper tube was irregular or the shrinkage of the wound filament occurred to result in deformation or shrinkage of the paper tube, it was judged as "poor take-up" denoted as "X". On the other hand, in the case that the overall appearance of the wound filament on the paper tube was smooth and even, the case may be further divided into three levels according to the degree of evenness and collection thickness thereof: the level of "fair" denoted as "Δ"; the level of "good" denoted as "○"; and the level of "excellent" denoted as "◎". The observation results of each group were recorded in Table 5-1 to Table 5-3.

In addition, the wound conjugate fiber was withdrawn by negative pressure pumping, and the fluency of the drawing process was used to evaluate the withdrawal thereof. In the case that the conjugate fiber could not be withdrawn, the result thereof would be judged as "poor to withdraw" denoted as "XX". In the case that the conjugate fiber could be withdrawn but filaments were stuck, tangled or breakage frequently happened in the duration, the result thereof would still be judged as "poor to withdraw" denoted as "X". In the case that the conjugate fiber could be withdrawn but the duration had interruption sometimes, the result thereof would be judged as "able to withdraw" denoted as "A". In the case that the conjugate fiber could be withdrawn and the duration had interruption occasionally, the result thereof would be judged as "able to withdraw" denoted as "○". In the case that the conjugate fiber could be withdrawn and the duration had almost no interruption, the result thereof would be judged as "able to withdraw" denoted as "◎". The observation results of each group were recorded in Table 5-1 to Table 5-3.

Further, the appearance of the conjugate fiber of each group after the withdrawal and drawing process was observed to analyze their potential self-crimpness.

In the case that the withdrawn and drawn conjugate fibers exhibited a smooth straight line without curls and the appearance still maintained the same after being stretched to 1.5 times the length, the result thereof was denoted as "XX".

In the case that the withdrawn and drawn conjugate fibers exhibited a smooth straight line without curls but the appearance had insignificant slight curls after being stretched to 1.5 times the length, the result thereof was denoted as "X".

In the case that the withdrawn and drawn conjugate fibers exhibited a smooth straight line without curls but the appearance had curls after being stretched to 1.5 times the length, the result thereof was denoted as "Δ".

In the case that the withdrawn and drawn conjugate fibers had almost no curls but the appearance was visibly curly after being stretched to 1.5 times the length, the result thereof was denoted as "○".

In the case that the appearance of the withdrawn and drawn conjugate fibers was visibly curly, the result thereof was denoted as "◎".

The observation results of each group were recorded in Table 5-1 to Table 5-3.

TABLE 5-1 kind of TPU contained in the first and second components and the volume ratio therebetween, preparation conditions, take-up performance, withdrawal performance and potential self-crimpness of TPU fibers of C1 and C2 and TPU self-crimping conjugate fibers of E1 to E4

| | C1 | C2 | E1 | E2 | E3 | E4 |
|---|---|---|---|---|---|---|
| TPU No. of the first component | TPU 1-1 | — | TPU 1-1 | TPU 1-1 | TPU 1-4 | TPU 1-2 |

TABLE 5-1-continued kind of TPU contained in the first and second components and the volume ratio therebetween, preparation conditions, take-up performance, withdrawal performance and potential self-crimpness of TPU fibers of C1 and C2 and TPU self-crimping conjugate fibers of E1 to E4

| | C1 | C2 | E1 | E2 | E3 | E4 |
|---|---|---|---|---|---|---|
| TPU No. of the second component | — | TPU 2-3 | TPU 2-2 | TPU 2-2 | TPU 2-2 | TPU 2-5 |
| Volume ratio | 100:0 | 0:100 | 50:50 | 30:70 | 50:50 | 50:50 |
| Temp.of Spinning extruder A | 190° C.-225° C. | 190° C.-225° C. | 200° C.-230° C. | 200° C.-230° C. | 200° C.-225° C. | 200° C.-230° C. |
| Temp.of Spinning extruder B | — | — | 200° C.-230° C. | 200° C.-230° C. | 180° C.-230° C. | 200° C.-235° C. |
| No. of conjugate spinneret assembly | Assembly F (2 sets) | | Assembly C | | | |
| Temp. of spinning box | 225° C. | 225° C. | 230° C. | 230° C. | 230° C. | 235° C. |
| Speed of GR1 (m/min) | 870 | 870 | 750 | 750 | 900 | 700 |
| Speed of GR2 (m/min) | 930 | 930 | 780 | 780 | 950 | 750 |
| Temp. of GR2 | 60° C. | 60° C. | 60° C. | 60° C. | 60° C. | 50° C. |
| Speed of GR3 (m/min) | 2200 | 2200 | 1980 | 1980 | 1880 | 1980 |
| Temp. of GR3 | 110° C. | 110° C. | 110° C. | 110° C. | 100° C. | 110° C. |
| Speed of GR4 (m/min) | 1980 | 2200 | 2000 | 2000 | 1900 | 2005 |
| Speed of GR5 (m/min) | 1980 | 2200 | 2010 | 2010 | 1950 | 2015 |
| Draw ratio | 2.13 | 2.37 | 2.58 | 2.58 | 2.05 | 2.69 |
| Speed of the winding machine (m/min) | 2000 | 2000 | 2000 | 2000 | 2000 | 2030 |
| Take-up performance | ◎ | ◎ | ◎ | ◎ | ○ | ◎ |
| Withdrawal performance | ◎ | ◎ | ◎ | ◎ | Δ | ◎ |
| Potential self-crimpness | XX | XX | ○ | ○ | ◎ | ◎ |

TABLE 5-2 kind of TPU contained in the first and second components and the volume ratio therebetween, preparation conditions, take-up performance, withdrawal performance and potential self-crimpness of TPU self-crimping conjugate fibers of E5 to E10 and E19 which was prior to undergoing the secondary processing method

| | E5 | E6 | E7 | E8 | E9 | E10 | E19 |
|---|---|---|---|---|---|---|---|
| TPU No. of the first component | TPU 1-7 | TPU 1-1 | TPU 1-1 | TPU 1-1 | TPU 1-1 | TPU 1-2 | TPU 1-1 |
| TPU No. of the second component | TPU 2-5 | TPU 2-5 | TPU 2-5 | TPU 2-5 | TPU 2-2 | TPU 2-3 | TPU 2-8 |
| Volume ratio | 50:50 | 30:70 | 50:50 | 40:60 | 40 :60 | 40:60 | 40:60 |
| Temp.of Spinning extruder A | 200° C.-230° C. | 190° C.-225° C. | 200° C.-230° C. | 190° C.-225° C. | 200° C.-230° C. | 190° C.-230° C. | 200° C.-225° C. |
| Temp.of | 200° C.- | 200° C.- | 205° C.- | 200° C.- | 200° C.- | 190° C.- | 200° C.- |

TABLE 5-2-continued kind of TPU contained in the first and second components and the volume ratio therebetween, preparation conditions, take-up performance, withdrawal performance and potential self-crimpness of TPU self-crimping conjugate fibers of E5 to E10 and E19 which was prior to undergoing the secondary processing method

| | E5 | E6 | E7 | E8 | E9 | E10 | E19 |
|---|---|---|---|---|---|---|---|
| Spinning extruder B | 235° C. | 245° C. | 240° C. | 235° C. | 230° C. | 230° C. | 230° C. |
| No. of conjugate spinneret assembly | Assembly C | Assembly D | | | Assembly E | | |
| Temp. of spinning box | 235° C. | 245° C. | 245° C. | 240° C. | 230° C. | 230° C. | 230° C. |
| Speed of GR1 (m/min) | 700 | 700 | 700 | 700 | 700 | 700 | 700 |
| Speed of GR2 (m/min) | 750 | 750 | 750 | 750 | 750 | 750 | 750 |
| Temp. of GR2 | 50° C. | 60° C. | 75° C. | 75° C. | 75° C. | 75° C. | 75° C. |
| Speed of GR3 (m/min) | 1980 | 2100 | 2650 | 1950 | 1950 | 1950 | 1950 |
| Temp. of GR3 | 110° C. | 70° C. | 100° C. | 100° C. | 100° C. | 100° C. | 100° C. |
| Speed of GR4 (m/min) | 2005 | 2450 | 2700 | 2000 | 2025 | 2025 | 2025 |
| Speed of GR5 (m/min) | 2015 | 2480 | 2700 | 2000 | 2000 | 2000 | 2000 |
| Draw ratio | 2.69 | 3.31 | 3.60 | 2.67 | 2.67 | 2.67 | 2.67 |
| Speed of the winding machine (m/min) | 2030 | 2300 | 2730 | 2000 | 2000 | 2000 | 2000 |
| Take-up performance | ◎ | ◎ | ◎ | ◎ | ◎ | ◎ | ◎ |
| Withdrawal performance | ○ | ○ | ◎ | ◎ | ◎ | ◎ | ◎ |
| Potential self-crimpness | ◎ | ◎ | ◎ | ○ | ○ | ○ | ◎ |

TABLE 5-3 kind of TPU contained in the first and second components and the volume ratio therebetween, preparation conditions, take-up performance, withdrawal performance and potential self-crimpness of TPU self-crimping conjugate fibers of E11A to E11C, E12A and E12B

| | E11A | E11B | E11C | E12A | E12B |
|---|---|---|---|---|---|
| TPU No. of the first component | TPU 1-2 | TPU 1-2 | TPU 1-2 | TPU 1-1 | TPU 1-1 |
| TPU No. of the second component | TPU 2-1 | TPU 2-1 | TPU 2-1 | TPU 2-2 | TPU 2-2 |
| Volume ratio | 30:70 | 50:50 | 70:30 | 40:60 | 60:40 |
| Temp. of Spinning extruder A | 200° C.-230° C. | 200° C.-230° C. | 200° C.-230° C. | 190° C.-230° C. | 190° C.-230° C. |
| Temp. of Spinning extruder B | 200° C.-230° C. | 200° C.-230° C. | 200° C.-230° C. | 190° C.-225° C. | 190° C.-225° C. |
| No. of conjugate spinneret assembly | | Assembly C | | Assembly D | |
| Temp. of spinning box | 230° C. | 230° C. | 230° C. | 230° C. | 230° C. |

Secondary Processing Method of Drawn-Yarn Type of TPU Self-Crimping Conjugate Fiber Example 13 (E13)

After being withdrawn and drawn, the drawn yarns of the TPU self-crimping conjugate fiber of Example 1 were then subjected to a series of five godet rollers which were temperature-controlled to obtain the TPU self-crimping conjugate fiber of Example 13. The speeds of said five godet rollers were 1500 m/min (GR1'), 1550 m/min (GR2'), 2000 m/min (GR3'), 2140 m/min (GR4'), and 2160m/min (GR5') sequentially. Wherein the temperature of GR2' was 75° C.; the drawn ratio of the secondary processing method was 1.39; the speed of the winding machine was 2000 m/min.

Example 14 (E14)

The preparation method of this example was similar to the preparation method of Example 13, except that the drawn yarns of the TPU self-crimping conjugate fiber of Example 1 were replaced with the drawn yarns of the TPU self-crimping conjugate fiber of Example 2.

Example 15 (E15)

The preparation method of this example was similar to the preparation method of Example 13, except that the drawn yarns of the TPU self-crimping conjugate fiber of Example 1 were replaced with the drawn yarns of the TPU self-crimping conjugate fiber of Example 3.

Example 16-1 (E16-1)

The drawn yarns of the TPU self-crimping conjugate fiber of Example 8 were reciprocally false-twisted with one ply to obtain draw textured yarns (DTY), that is, fluffy textured yarns of the TPU self-crimping conjugate fiber was obtained. Wherein the set temperature of the non-contact heater was 120° C.; the false twister was configured ceramic disc spindle 1-4-1; the draw ratio was 1.32; the speed of processing was 400 m/min.

Example 16-2 (E16-2)

The drawn yarns of the TPU self-crimping conjugate fiber of Example 8 were reciprocally false-twisted with two plys to obtain draw textured yarns, that is, fluffy textured yarns of the TPU self-crimping conjugate fiber were obtained. Wherein the set temperature of the non-contact heater was 120° C.; the false twister was configured ceramic disc spindle 1-4-1; the draw ratio was 1.32; the speed of processing was 400 m/min.

Example 17 (E17)

The drawn yarns of the TPU self-crimping conjugate fiber of Example 9 were reciprocally false-twisted with one ply to obtain draw textured yarns, that is, fluffy textured yarns of the TPU self-crimping conjugate fiber were obtained. Wherein the set temperature of the non-contact heater was 130° C.; the false twister was configured ceramic disc spindle 1-4-1; the draw ratio was 1.3; the speed of processing was 300 m/min.

Example 18 (E18)

The drawn yarns of the TPU self-crimping conjugate fiber of Example 10 were reciprocally false-twisted with one ply to obtain draw textured yarns, that is, fluffy textured yarns of the TPU self-crimping conjugate fiber were obtained. Wherein the set temperature of the non-contact heater was 120° C.; the false twister was configured ceramic disc spindle 1-4-1; the draw ratio was 1.3; the speed of processing was 300 m/min.

Example 20 (E20)

The drawn yarns of the TPU self-crimping conjugate fiber of Example 19 were reciprocally false-twisted with two plys to obtain draw textured yarns, that is, fluffy textured yarns of the TPU self-crimping conjugate fiber were obtained. Wherein the set temperature of the non-contact heater was about from 115° C. to 120° C.; the false twister was configured ceramic disc spindle 1-4-1; the draw ratio was 1.3; the speed of processing was 300 m/min.

Analysis 6: Physical Property Tests of the Untextured Yarns and Textured Yarns Of The Conjugate Fibers In order to ensure the experimental significance and validity of the characteristic analysis, the TPU self-crimping conjugate fibers of Examples 1 to 10 and 13 to 20 and the TPU fibers of Comparative Examples 1 and 2 were respectively analyzed by the same methods. The methods described below were for crystallization temperature (Tc) and enthalpy value per unit weight of the conjugate fibers, filament count of a multifilament (F), fiber fineness, breaking strength, elongation and crimp contraction, and the results were listed in Table 6-1 to Table 6-4.

Methods for Analyzing Mechanical Characteristics:

1. Tc and enthalpy per unit weight: a DSC (manufacturer: Mettler Toledo® Company, model: DSC821E) was used. First, about 5 milligrams (mg) to 10 mg of the conjugate fibers to be analyzed was put into an aluminum crucible; wherein the temperature of the DSC chamber was set at 25° C., and the nitrogen flow rate was 80 milliliters/minute (mL/min). After that, the DSC chamber was cooled to −80° C. with a cooling rate of 10° C. per minute and hold at −80° C. for 3 min. Next, the DSC chamber was heated to a temperature of 220° C. to 250° C. with a heating rate of 10° C. per minute and hold at said temperature for 3 min; then, the DSC chamber was again cooled to −80° C. with a cooling rate of 10° C. per minute and hold at −80° C. for 3 min. The peak value in the duration of the aforementioned process represented its crystallization temperature (Tc) and its enthalpy per unit weight (Joule/gram, J/g).
2. Fiber fineness/fineness of an individual filament: each group of the tested conjugate fibers was measured by the unit of denier (weight in grams for 9000 meters) in accordance with the standard method ASTM 1907. In addition, the fineness of an individual filament was the quotient obtained by the fiber fineness being divided by the count of the filaments in the fiber.
3. Breaking strength of fiber: measured by a fully automatic tensile tester (manufacturer: Textechno H. Stein GmbH & Co) in accordance with the standard method ASTM D 2256.
4. Elongation (E): measured by a fully automatic tensile tester (manufacturer: Textechno H. Stein GmbH & Co) in accordance with the standard method ASTM D 2256.
5. Crimp contraction: measured by an automatic crimp contraction and shrinkage tester (manufacturer: Textechno Co.; model: TEXTURMAT ME+) in accordance with the German Chemical Society standard method DIN53840. Specifically, after winding the sample to be analyzed to a certain length, the sample to be analyzed was boiled in a water bath of 97° C. or above for 5 min, and then it was taken out and drained for 10 m; next, the sample to be analyzed was heated in the oven (60° C.) for 30 m, and then it was put into a tank with water, and finally, the difference weights of the loads were used to calculate the crimp contraction thereof.

TABLE 6-1

| | Group No. | | | | |
|---|---|---|---|---|---|
| | C1 | C2 | E1 | E2 | E3 |
| Type of fiber | Drawn-yarn type of multifilament structure | | Drawn-yarn type of multifilament structure | | |
| Appearance | Nearly white straight | Lake-blue straight | Red straight | | |
| Tc (° C.) | 134.69 | 153.48 | 149.58 | 146.90 | 144.86 |
| Enthalpy per unit weight (J/g) | 18.64 | 24.06 | 19.27 | 18.45 | 19.82 |
| Fiber fineness (D) | 204 | 197 | 103 | 120 | 250 |
| Count of the filaments in the fiber (piece) | 48 | 48 | 24 | 24 | 48 |
| Fineness of an individual filament (D) | 4.25 | 4.10 | 4.29 | 5.00 | 5.21 |
| Breaking strength (g/D) | 1.72 | 2.46 | 2.16 | 2.05 | 1.81 |
| Elongation (%) | 65.5 | 94.1 | 115 | 106 | 67.3 |
| Crimp contraction (%) | — | — | — | — | — |

TABLE 6-2

| | Group No. | | | | |
|---|---|---|---|---|---|
| | E4 | E5 | E6 | E7 | E8 |
| Type of fiber | Drawn-yarn type of multifilament structure | | | | |
| Appearance | Lake-blue curly | Lake-blue curly | Nearly white curly | Nearly white curly | Nearly white straight |
| Tc (° C.) | 155.22 | 155.78 | 155.08 | 150.33 | 155.20 |
| Enthalpy per unit weight (J/g) | 22.12 | 20.98 | 23.95 | 24.53 | 21.79 |
| Fiber fineness (D) | 96.3 | 91.4 | 80 | 130 | 195 |
| Count of the filaments in the fiber (piece) | 24 | 24 | 36 | 24 | 24 |
| Fineness of an individual filament (D) | 4.01 | 3.81 | 2.22 | 5.42 | 8.13 |
| Breaking strength (g/D) | 2.37 | 2.53 | 3.40 | 2.32 | 2.45 |
| Elongation (%) | 64.9 | 60.0 | 34.8 | 45.3 | 105 |
| Crimp contraction (%) | 11.5 | 13.2 | 9.5 | 8.0 | — |

TABLE 6-3

| | Group No. | | | | | |
|---|---|---|---|---|---|---|
| | E9 | E10 | E13 | E14 | E15 | E19 |
| Type of fiber | Drawn-yarn type of multifilament structure | | | | | |
| Appearance | Red straight | Lake-blue straight | Red curly | | | Nearly white straight |
| Tc (° C.) | 142.54 | 148.63 | 143.51 | 145.29 | 141.85 | 152.02 |
| Enthalpy per unit weight (J/g) | 21.03 | 17.99 | 18.76 | 18.62 | 16.64 | 19.37 |
| Fiber fineness (D) | 197 | 194 | 77.5 | 78.6 | 203 | 190 |

TABLE 6-3-continued

| | Group No. | | | | | |
|---|---|---|---|---|---|---|
| | E9 | E10 | E13 | E14 | E15 | E19 |
| Count of the filaments in the fiber (piece) | 24 | 24 | 24 | 24 | 48 | 24 |
| Fineness of an individual filament (D) | 8.21 | 8.08 | 3.23 | 3.28 | 4.23 | 7.92 |
| Breaking strength (g/D) | 2.20 | 1.90 | 2.64 | 2.32 | 2.08 | 1.73 |
| Elongation (%) | 79.8 | 75.4 | 44.7 | 44.6 | 42.4 | 83.61 |
| Crimp contraction (%) | — | 9.6 | 12.2 | 13.7 | 20 | — |

TABLE 6-4

| | Group No. | | | | |
|---|---|---|---|---|---|
| | E16-1 | E16-2 | E17 | E18 | E20 |
| Type of fiber | textured yarns | | | | |
| Appearance | Nearly white curly | | Red curly | Lake-blue curly | Nearly white curly |
| Tc (° C.) | 153.52 | 154.37 | 139.54 | 151.60 | 153.24 |
| Enthalpy per unit weight (J/g) | 22.83 | 22.80 | 22.07 | 19.89 | 22.42 |
| Fiber fineness (D) | 161 | 307 | 163 | 159 | 300 |
| Count of the filaments in the fiber (piece) | 24 | 48 | 24 | 24 | 48 |
| Fineness of an individual filament (D) | 6.71 | 6.40 | 6.79 | 6.63 | 6.25 |
| Breaking strength (g/D) | 2.44 | 2.32 | 2.23 | 2.07 | 1.88 |
| Elongation (%) | 56.2 | 52.4 | 48.2 | 44.2 | 40.6 |
| Crimp contraction (%) | 3.9 | 3.9 | 8.4 | 8.8 | 12.4 |

Analysis 7: Observation of the Morphology of the TPU Self-Crimping Conjugate Fiber Fiber Crimpness With reference to FIG. 3, it was a drawn yarn form of the TPU self-crimping conjugate fiber of Example 4 taken with a smartphone. In addition, with reference to FIG. 4, it was a photograph for one individual filament drawn out from the drawn yarn form of the TPU self-crimping conjugate fiber of Example 4 taken with a metallographic microscope (manufacturer: ZAK TECH; model: MQ-Series); wherein the objective lens of the metallographic microscope had the magnification of 100 times.

Figure 5:
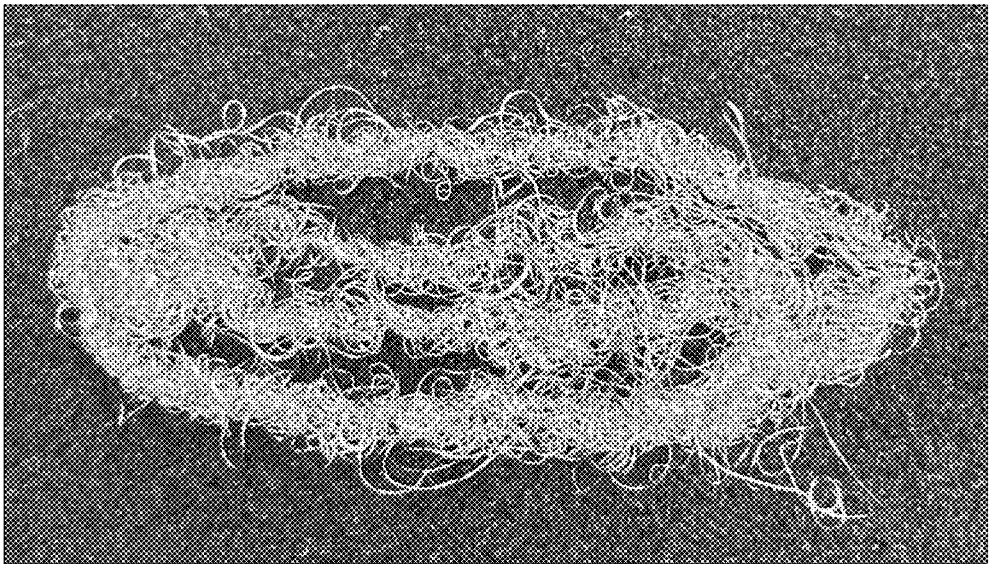
FIG. 5 is a photo of the bulk textured yarn form of the TPU self-crimping conjugate fiber of Example 17 taken with a smartphone.
Figure 6:
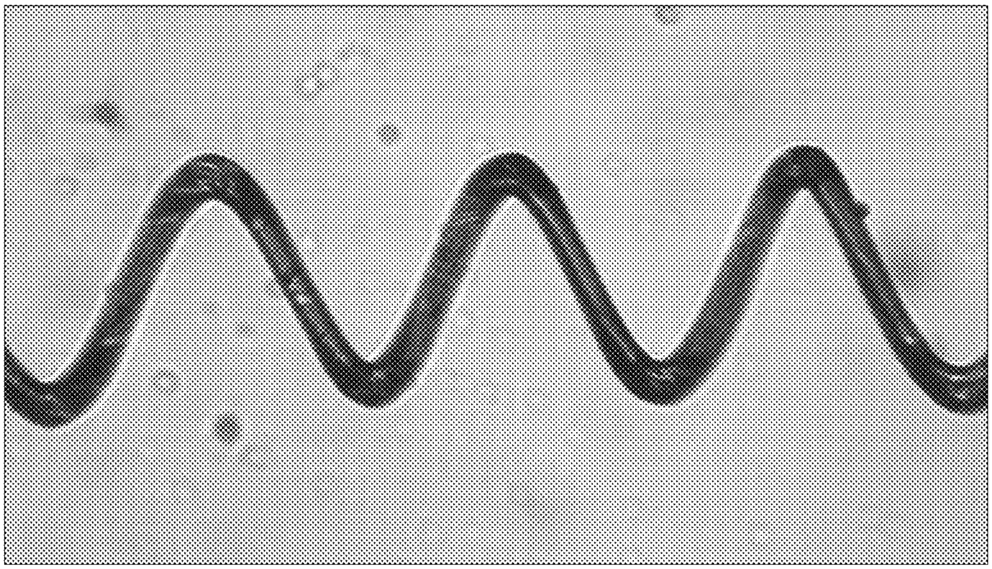
FIG. 6 is a photo of one monofilament from the bulk textured yarn form of the TPU self-crimping conjugate fiber of Example 17 taken with a metallographic microscope.

Please refer to FIG. 5: it was a photograph of the bulk textured yarn form of the TPU self-crimping conjugate fiber of Example 17 taken with a smartphone. In addition, with reference to FIG. 6, it was a photograph for one individual filament drawn out from the bulk textured yarn form of the TPU self-crimping conjugate fiber of Example 17 taken with the metallographic microscope.

Figure 3:
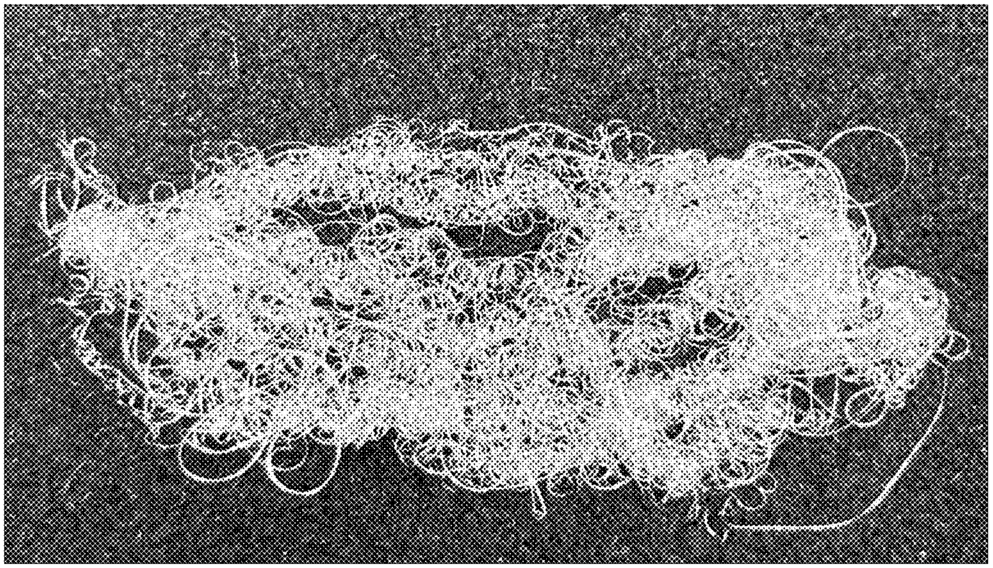
FIG. 3 is a photo of the drawn-yarn type of the TPU self-crimping conjugate fiber of Example 4 taken with a smartphone.
Figure 4:
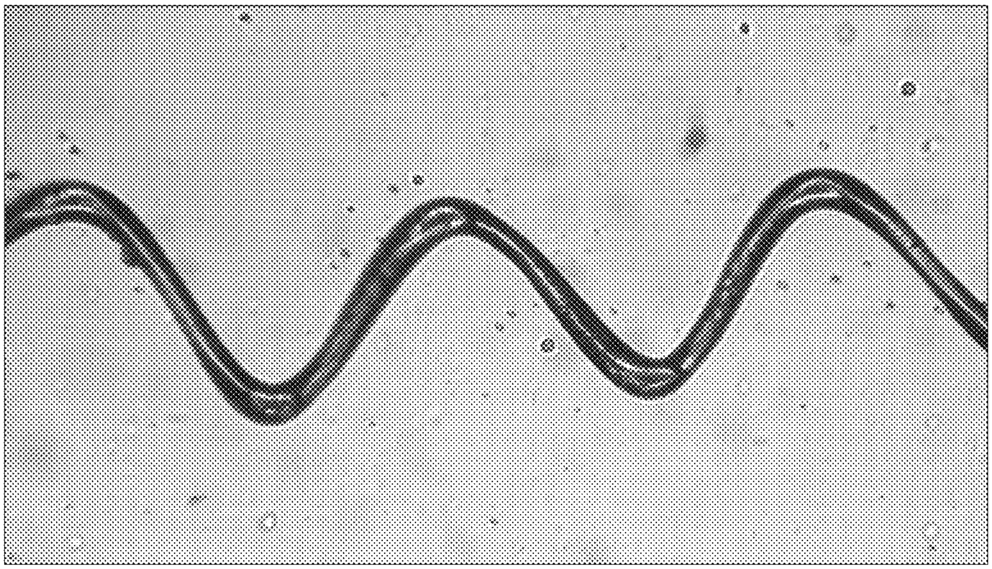
FIG. 4 is a photo of one monofilament from the drawn-yarn type of the TPU self-crimping conjugate fiber of Example 4 taken with a metallographic microscope.

From FIG. 3 and FIG. 5, the TPU self-crimping conjugate fiber of the present disclosure could indeed have an obviously curly and fluffy appearance, regardless that the TPU self-crimping conjugate fiber was in the form of drawn yarns or bulk textured yarns which were obtained by a fluffing processing. In addition, from FIG. 4 and FIG. 6, the individual filament of the TPU self-crimping conjugate fiber of the present disclosure had a roughly regular and spiral shape.

Further, the individual filaments of the TPU fibers of C1 and C2 and the individual filaments of the TPU self-crimping conjugate fibers of E4, E5, E6, E16, E17, E18 and E20 were respectively taken out, and the above-mentioned filaments of each group were placed under the objective lens of a metallographic microscope. (manufacturer: ZAK TECH; model: MQ-Series) to measure the count of crimps per unit length (1 cm) of each filament (unit: crimps/cm). The larger the number, the fluffier the conjugate fiber would be. The calculation method for the count of crimps per unit length was as follows: one individual filament with a length of about 5 cm was taken from the multifilament; next, it was clamped with two clamps at both ends 3 cm apart, followed by being stretched to 5 cm, and then it was released naturally; the metaloscope was used to observe at least 3 parts of the sample with a magnification of 100 times. The length between two spiral coils of the sample was measured at each part, and the average value thereof was calculated; moreover, said result then was converted into the number of coils per unit length. The experimental results of each group were listed in Table 7.

TABLE 7 results of crimpness of TPU fibers of C1 and C2 and of TPU self-crimping conjugate fibers of E4 to E6 and E16 to E18

| Group No. | Average length between two coils (cm) | Number of coils per unit length (count/cm) |
|---|---|---|
| C1 | — | 0 |
| C2 | — | 0 |
| E4 | 0.07 | 28.6 |
| E5 | 0.16 | 12.5 |
| E6 | 0.07 | 28.6 |
| E16 | 0.10 | 20 |
| E17 | 0.05 | 40 |
| E18 | 0.05 | 40 |
| E20 | 0.05 | 40 |

Morphology of Cross Section of Fiber

The preparation method for the sample was described as follows: a sample (i.e. the fiber to be analyzed) passed through the through hole of a thin aluminum foil; then, a slicer was used to cut out the sample which showed the cross section thereof along the thin aluminum sheet. After that, the optical microscope was focused to observe the cross-sectional shape of said sample which was then photographed. Wherein, the ocular lens of the optical microscope was equipped with a digital magnification objective lens to display images on a computer screen.

Figure 7A:
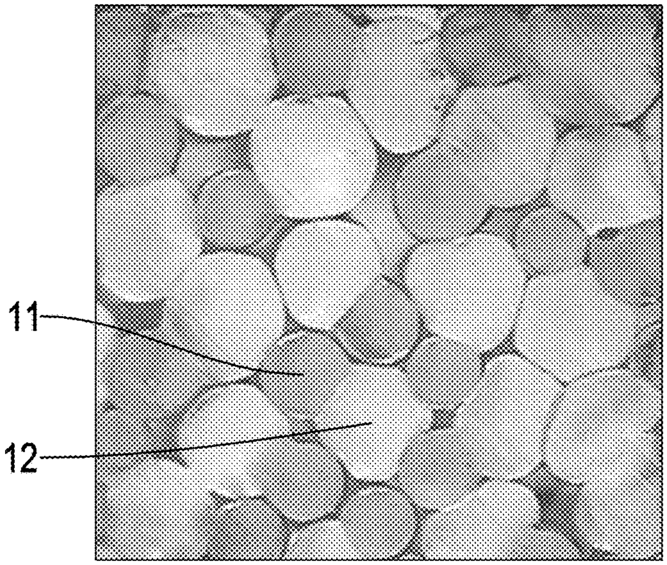
FIG. 7A is a photo of the cross-sectional view of the free-flow filaments of the TPU self-crimping conjugate fibers of Example 11A taken with an optical microscope.
Figure 7B:
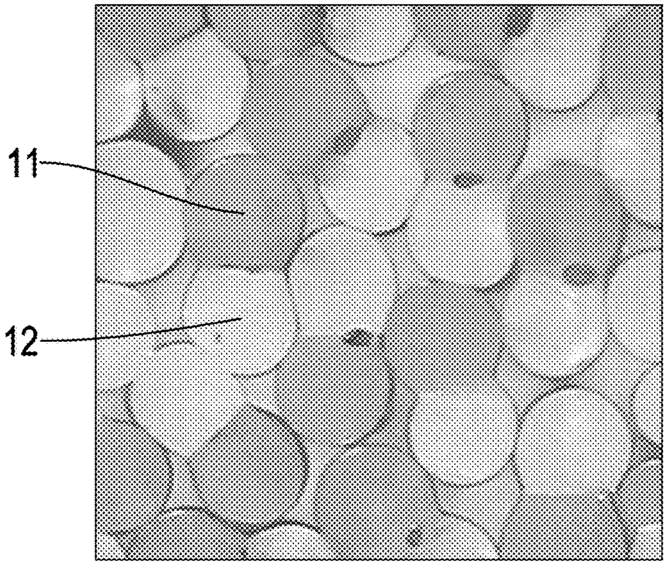
FIG. 7B is a photo of the cross-sectional view of the free-flow filaments of the TPU self-crimping conjugate fibers of Example 11B taken with an optical microscope.
Figure 7C:
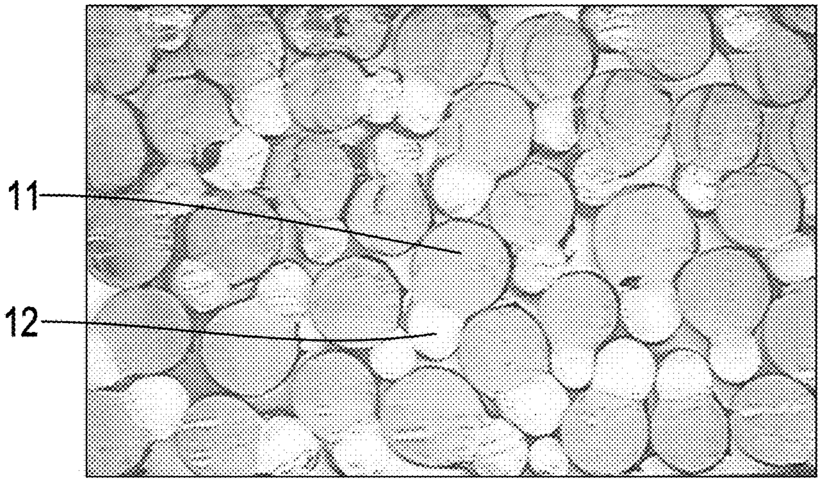
FIG. 7C is a photo of the cross-sectional view of the free-flow filaments of the TPU self-crimping conjugate fibers of Example 11C taken with an optical microscope.

The TPU self-crimping conjugate fibers (free-flow filament type) of E11A to E11C were processed according to the preparation method of the above samples, and then the cross-sectional shapes thereof were respectively observed by the optical microscope with a magnification of 70 times (i.e. ×70) to obtain the images of FIG. 7A to FIG. 7C.

From FIG. 7A to FIG. 7C, since the TPU 1-2 of the first component was obtained by the raw materials comprising a polyol containing a blue chromophore, the first region 11 formed by the TPU 1-2 of the first component in the cross section indeed exhibited blue color. Also, as the volume ratio of the first component increased in E11A to E11C, the area of the first region 11 in each cross section became larger. In addition, the TPU self-crimping conjugate fibers of E11A to E11C were formed through the spinneret of side-by-side type, so in the case that the ratio of the first component to the second component was not exactly 50:50, the cross-section would be peanut shaped (orthographic projection of two circles of different sizes overlapping), just as shown in FIG. 7A and FIG. 7C.

Figure 8A:
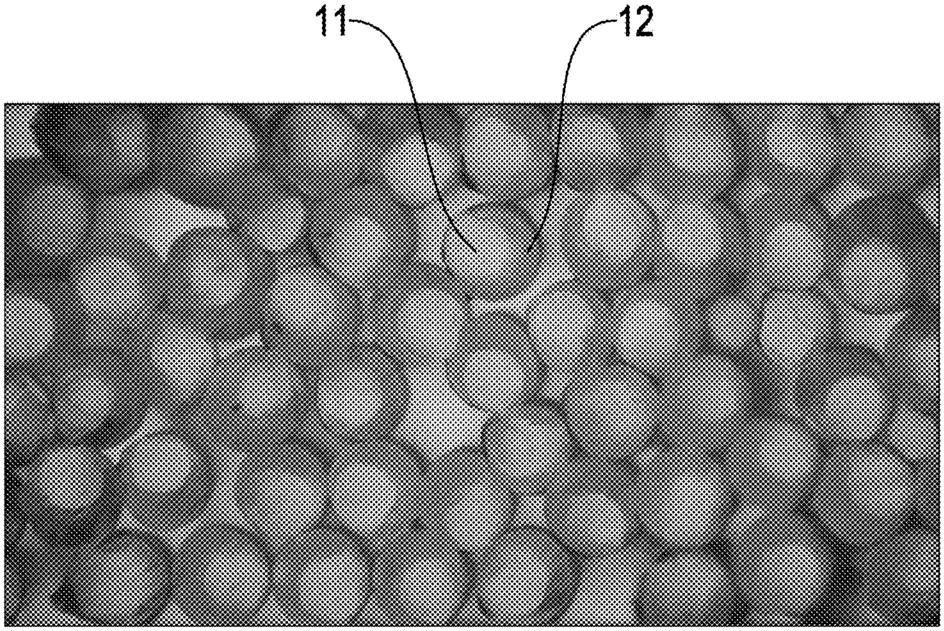
FIG. 8A is a photo of the cross-sectional view of the free-flow filaments of the TPU self-crimping conjugate fibers of Example 12A taken with an optical microscope.
Figure 8B:
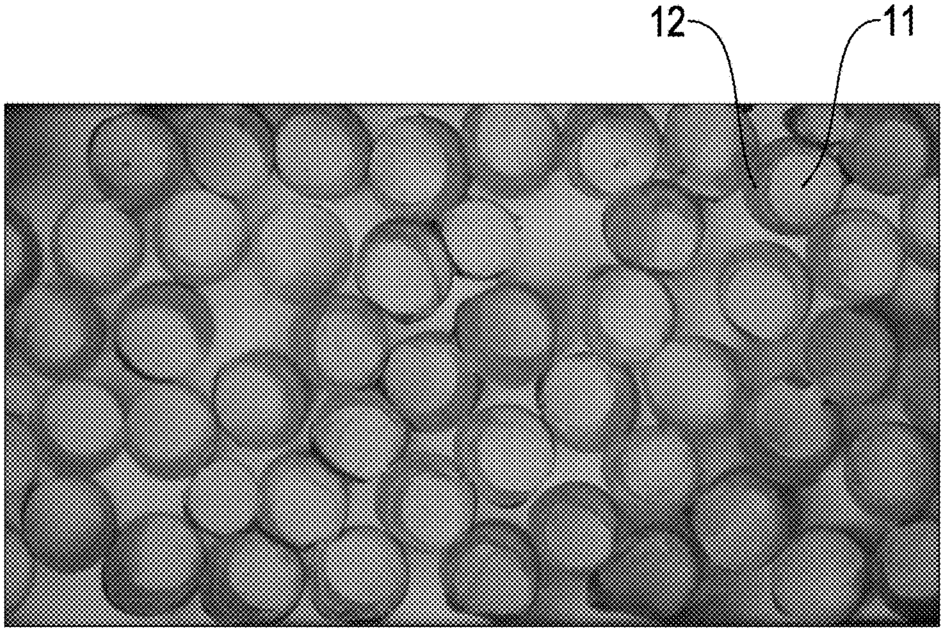
FIG. 8B is a photo of the cross-sectional view of the free-flow filaments of the TPU self-crimping conjugate fibers of Example 12B taken with an optical microscope.

The TPU self-crimping conjugate fibers (free-flow filament type) of E12A and E12B were processed according to the preparation method of the above samples, and then the cross-sectional shapes thereof were respectively observed by the optical microscope with a magnification of 70 times (i.e. ×70) to obtain the images of FIG. 8A and FIG. 8B.

From FIG. 8A and FIG. 8B, since the TPU 2-2 of the second component was obtained by the raw materials comprising a polyol containing a red chromophore, the second region 12 formed by the TPU 2-2 of the second component in the cross section indeed exhibited red color. Also, as the volume ratio of the second component was different in E12A and E12B, the area of the second region 12 in each cross section became different. In addition, the TPU self-crimping conjugate fibers of E12A and E12B were formed through the spinneret of an eccentric core-sheath type, so the cross-sections of the TPU self-crimping conjugate fibers of E12A and E12B would be roughly circular, just as shown in FIG. 8A and FIG. 8B.

Figure 9:
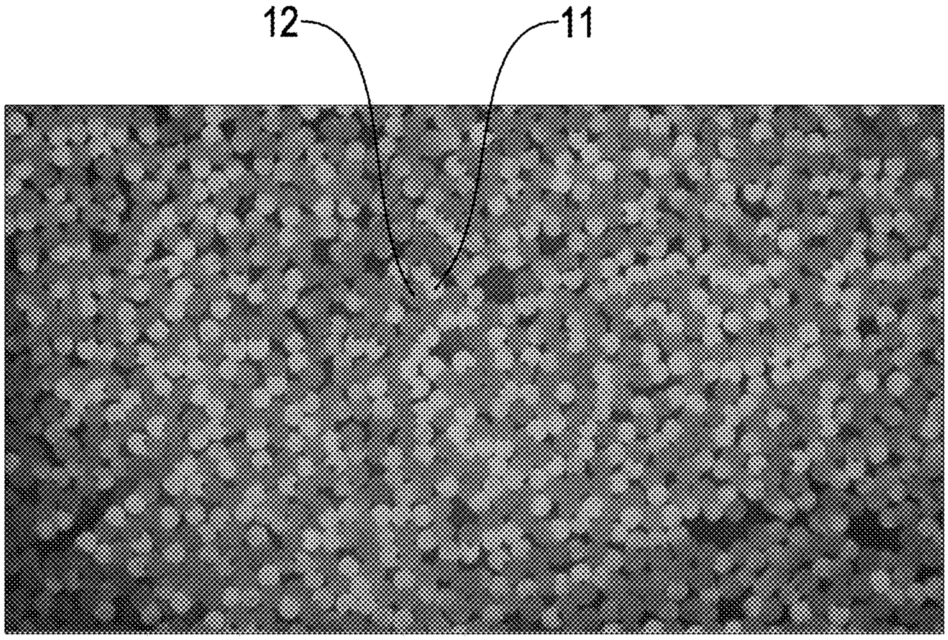
FIG. 9 is a photo of the cross-sectional view of the drawn yarn of the TPU self-crimping conjugate fibers of Example 9 taken with an optical microscope.

Besides, the TPU self-crimping conjugate fiber (drawn-yarn type) of E9 was processed according to the preparation method of the above sample, and then the cross-sectional shape thereof was observed by the optical microscope with a magnification of 100 times (i.e. ×100) to obtain the image of FIG. 9.

From FIG. 9, since the TPU 2-2 of the second component was obtained by the raw materials comprising a polyol containing a red chromophore, the second region 12 formed by the TPU 2-2 of the second component in the cross section indeed exhibited red color. Also, from the comparison between FIG. 7B and FIG. 9, it could be seen that although the TPU self-crimping conjugate fibers of E11B and E9 were formed by the spinneret of side-by-side type, the spinneret assemblies therein were different, so the resulting cross-sections thereof were also different.

Analysis 8: Elastic Recovery of Drawn-Yarn Type/Textured-Yarn Type of Conjugate Fiber According to the Standard Method DIN 53835-2, the elongation amount was defined as the product of the elongation of the fiber to be measured multiplying 60%. The TPU self-crimping conjugate fibers of E4, E8, E9, E10, E16, E17, E18, E19 and E20, and the TPU fibers of C1 and C2 were respectively measured, and the results were recorded in Table 8.

TABLE 8 elastic recoveries of TPU fibers of C1 and C2 and of TPU self-crimping conjugate fibers of E4, E8 to E10 and E16 to E20

| Group No. | Elastic recovery |
|---|---|
| C1 | 36.3% |
| C2 | 57.0% |
| E4 | 64.4% |
| E8 | 44.6% |
| E9 | 52.4% |
| E10 | 41.6% |
| E16 | 60.2% |
| E17 | 67.0% |
| E18 | 61.3% |
| E19 | 45.9% |
| E20 | 59.8% |

《Fabric》

The above-mentioned TPU self-crimping conjugate fibers were respectively knitted into a fabric using a laboratory small circular knitting machine. Specifically, the fabric could be the above-mentioned TPU self-crimping conjugate fiber in the form of the drawn yarn or the textured yarn, and it was introduced into said circular knitting machine from top to bottom to continuously knit a garter with a length of 100 cm.

In addition, the above-mentioned TPU self-crimping conjugate fiber also could be made into a flat-knitted sample piece of fabric by using a flat knitting machine (manufacturer: Shimadzu Corporation of Japan). A plurality of individual filaments from the darn yarns or one or more strands of textured yarns of the above-mentioned TPU self-crimping conjugate fiber were transversely introduced into a flat knitting machine, and a flat-knitted sample piece of fabric was obtained by knitting back and forth. Wherein the flat-knitted sample piece of fabric had a length and width of about 20 cm to 30 cm each.

Moreover, before flat-knitted sample piece of fabrics was made, the TPU fiber (such as C 1 and C2) or TPU self-crimping conjugate fiber (such as E8) could be subjected to an air-twist process to obtain air textured yarn (ATY). Generally speaking, the form of air textured yarns was better than the form of drawn yarns before undergoing the air-twist process in fluffiness, softness, gloss and other properties.

Analysis 9: Knitting Fluency of TPU Self-Crimping Conjugate Fiber

The criterion of this test was based on the fluency of the knitting operation. In the case that there were more than three discontinuities caused by breaking filaments when the TPU self-crimping conjugate fiber was withdrawn and/or introduced into the knitting machine, it would be rated as "poor" denoted as "X".

In the case that there was one or two discontinuities caused by breaking filaments when the TPU self-crimping conjugate fiber was withdrawn and/or introduced into the knitting machine or there was one or two defects in the texture of the obtained fabric, it would be rated as "fair" denoted as "Δ".

In the case that the knitting was fluent, and the obtained fabric had no flawless and the size thereof was stable, it would be rated as "good" denoted as "○"; wherein the better ones among those of "good" would be denoted as "◎".

The experimental results of the TPU self-crimping conjugate fibers of E4, E8 and E14 to E18 and the TPU fibers of C1 and C2 were taken as representatives and were recorded in Table 9 and Table 10.

Analysis 10: Softness, Richly Fluffy Feel and Tensile Recovery of Fabrics

The softness, richly fluffy feel and tensile recovery of the fabrics were respectively scored through blinded experiments; wherein three persons skilled in the field attended each blinded experiment, and the three persons had to score each sample individually, and then the scores from the three persons were added up, and the one with the highest score was considered as the best.

The scoring criteria of softness: the stiffer the touch, the lower the score; each person rated on a scale of 1 to 5.

Rating scale for "richly fluffy feel": the fuller the feeling, the higher the score; each person rated on a scale of 1 to 5.

The scoring criteria of tensile recovery: when the fabric to be analyzed was stretched to 10% to 30% in X, Y and Z directions and then released, the slower the rebound, the lower the score; that is, the faster the rebound, the higher the score. Each person rated on a scale of 1 to 5.

The evaluation results of the circular knitted garters as fabrics were listed in Table 9, and the evaluation results of the flat-knitted sample piece of fabrics were listed in Table 10.

TABLE 9 fibers adopted in circular knitted garters of Comparative Example 1A (C1A), Example 4A(E4A), Examples 14A to 18A (E14A to E18A), fiber fineness and counts of the filaments thereof; number of fibers used by the circular knitting machine, fabric color, knitting fluency, and the analytic results of softness, richly fluffy feel and tensile recovery of fabric

| | C1A | E4A | E14A | E15A | E16A | E17A | E18A |
|---|---|---|---|---|---|---|---|
| Fiber No. | C1 | E4 | E14 | E15 | E16-1 | E17 | E18 |
| Fiber fineness (D) | 200 | 96.3 | 78.6 | 203 | 161 | 163 | 159 |
| Count of the filaments in the fiber (piece) | 48 | 24 | 24 | 48 | 24 | 24 | 24 |
| Number of fibers used by the circular knitting machine | 1 piece | 1 piece | 1 piece | 1 piece | 1 ply | 1 ply | 1 ply |
| Fabric color | nearly white | lake-blue | red | red | nearly white | red | lake-blue |
| Knitting fluency | Δ | ◎ | ◎ | ◎ | ◎ | ◎ | ◎ |
| Softness of fabric | 6 | 12 | 15 | 14 | 14 | 15 | 14 |
| Richly fluffy feel of fabric | 6 | 10 | 10 | 12 | 15 | 14 | 14 |
| Tensile recovery of fabric | 6 | 14 | 11 | 13 | 14 | 14 | 15 |

TABLE 10 fibers adopted in flat-knitted sample piece of fabrics of Comparative Example 1B (C1B) and Comparative Example 2B (C2B), Example 4B (E4B), Example 8B (E8B) Examples 16B (E16B) and 17B (E17B), fiber fineness and counts of the filaments thereof; number of fibers used by the flat knitting machine, fabric color, knitting fluency, and the analytic results of softness, richly fluffy feel and tensile recovery of fabric

| | C1B | C2B | E4B | E8B | E16B | E17B |
|---|---|---|---|---|---|---|
| Fiber No. | C1 in the form of ATY | C2 in the form of ATY | E4 | E8 in the form of ATY | E16-2 in the form of DTY | E17 in the form of DTY |

TABLE 10-continued fibers adopted in flat-knitted sample piece of fabrics of Comparative Example 1B (C1B) and Comparative Example 2B (C2B), Example 4B (E4B), Example 8B (E8B) Examples 16B (E16B) and 17B (E17B), fiber fineness and counts of the filaments thereof; number of fibers used by the flat knitting machine, fabric color, knitting fluency, and the analytic results of softness, richly fluffy feel and tensile recovery of fabric

| | C1B | C2B | E4B | E8B | E16B | E17B |
|---|---|---|---|---|---|---|
| Fiber fineness (D) | 500 | 500 | 96.3 | 300 | 300 | 150 |
| Count of the filaments in the fiber (piece) | 72 | 96 | 24 | 48 | 48 | 24 |
| Number of fibers used by the circular knitting machine | 3 plys | 2 plys | 4 pieces | 2 plys | 2 plys | 4 plys |
| Fabric color | nearly white | lake-blue | lake-blue | nearly white | nearly white | red |
| Smoothness of knitting | Δ | Δ | ◎ | ◎ | ◎ | ◎ |
| Softness of fabric | 3 | 9 | 12 | 13 | 15 | 12 |
| Richly fluffy feel of fabric | 5 | 9 | 9 | 13 | 15 | 12 |
| Tensile recovery of fabric | 3 | 7 | 10 | 13 | 15 | 11 |

Discussion on Experimental Results

From the results in Table 4, when groups 1 to 14 each formed a conjugate fiber by selecting one from TPU 1-1 to TPU 1-7 and the other one from TPU 2-1 to TPU 2-8, the resulting conjugate fibers could indeed have a certain degree of crimpness and good compatibility. In contrast, in the case that a combination of any two species from TPU 1-1 to TPU 1-7 was selected, or a combination of any two species from TPU 2-1 to TPU 2-8 was selected, even though the resulting conjugate fibers of Groups 17 and 18 could be immediately curled after being wound, the crimpness of the resulting conjugate fibers of Groups 17 and 18 were significantly reduced after a period of time; especially, the curl shape thereof could no longer maintain for more than half of one day.

Similarly, from the potential self-crimping analysis results in Tables 5-1 to 5-3, it could be understood that neither the first TPU nor the second TPU had potential self-crimpness when it was made into fibers. However, when the first TPU and the second TPU were combined into a conjugate fiber, it could exhibit the potential self-crimpness at least after being stretched.

Besides, it could be seen from the results of Group 14 in Table 4 that even though adopting a recycled TPU (such as TPU 2-8) as raw materials for the TPU self-crimping conjugate fiber of the present disclosure, the obtained TPU self-crimping conjugate fiber still could have good compatibility and good crimpness.

With reference to the results of Tables 5-1 to 5-3 and the corresponding Tables 6-1 to 6-4, when the TPU self-crimping conjugate fiber of the present disclosure was in the form of drawn yarns, the TPU self-crimping conjugate fibers of E4, E5, E6 and E7 which were with an elongation of less than 65% could already show obvious curls upon discharge. Further, although the TPU self-crimping conjugate fibers of E1, E2 and E3, which were with an elongation of 65% or more, were each straight in the state of discharging, they exhibited the curled shape immediately after each of them was drawn twice (i.e. E13 to E15). Moreover, the textured yarn types of the TPU self-crimping conjugate fibers of E16, E17, E18 and E20 all showed obvious curled shapes when they were produced.

With reference to Table 5-1 and Table 5-2, it could be inferred from the curly shape of the form of the drawn yarns of the TPU self-crimping conjugate fiber E5, even though the raw material of the first component adopted a recycled material which meant that not all of the first component was the first TPU, the TPU conjugate fiber formed thereby still could have good self-crimpness as long as it still complies with the first component defined in the present disclosure. In demonstrates that products made by the TPU self-crimping conjugate fiber of the present disclosure can indeed be recycled and reused. In addition, even though the raw material of the second component adopted a recycled material, the TPU conjugate fiber formed thereby such as E20 still could have good self-crimpness as long as it still complies with the first component defined in the present disclosure. As a result, TPU self-crimping conjugate fiber of the present disclosure can indeed reduce the impact on the environment and energy consumption, thereby achieving the goal of sustainable development.

From the results in Table 5-1 to Table 5-3 and Table 8, all of the TPU self-crimping conjugate fibers of E8, E9, E16 and E17 contained TPU 1-1 as the first component, but all of said TPU self-crimping conjugate fibers had a higher elastic recovery than that of the TPU fiber of C1 which was made only by TPU 1-1. In addition, since the TPU self-crimping conjugate fibers of E4 and E16 to E18 and E20 were obviously curled, each of them had an elastic recovery of almost, or even over 60%.

Further, the raw material components of the TPU self-crimping conjugate fibers of E8 and E16 were the same, and the only difference was that E8 was in the form of drawn yarns and E16 was in the form of textured yarns. From the results in Table 8, it could be seen that when the TPU self-crimping conjugate fiber of E8 in the form of drawn yarns underwent a simple process to obtain the TPU self-crimping conjugate fiber of E16 in the form of textured yarns, the appearance of the TPU self-crimping conjugate fiber became obviously curled from the original flat straight line, and the elastic recovery would increase by nearly 15%.

Similarly, the raw material components of the TPU self-crimping conjugate fibers of E9 and E17 were the same, and the only difference was that E9 was in the form of drawn yarns and E17 was in the form of textured yarns. From the results in Table 8, it could be seen that when the TPU self-crimping conjugate fiber of E9 in the form of drawn yarns underwent a simple process to obtain the TPU self-crimping conjugate fiber of E17 in the form of textured yarns, the appearance of the TPU self-crimping conjugate fiber became obviously curled from the original flat straight line, and the elastic recovery would also increase by nearly 15%.

Similarly, the raw material components of the TPU self-crimping conjugate fibers of E10 and E18 were the same, and the only difference was that E10 was in the form of drawn yarns and E18 was in the form of textured yarns. From the results in Table 8, it could be seen that when the TPU self-crimping conjugate fiber of E10 in the form of drawn yarns underwent a simple process to obtain the TPU self-crimping conjugate fiber of E18 in the form of textured yarns, the appearance of the TPU self-crimping conjugate fiber became obviously curled from the original flat straight line, and the elastic recovery would even increase by nearly 20%.

Similarly, the raw material components of the TPU self-crimping conjugate fibers of E19 and E20 were the same, and the only difference was that E19 was in the form of drawn yarns and E20 was in the form of textured yarns. From the results in Table 8, it could be seen that when the TPU self-crimping conjugate fiber of E19 in the form of drawn yarns underwent a simple process to obtain the TPU self-crimping conjugate fiber of E20 in the form of textured yarns, the appearance of the TPU self-crimping conjugate fiber became obviously curled from the original flat straight line, and the elastic recovery would also increase by nearly 15%.

From the results of Tables 9 and 10, even though the TPU fibers of C1 and C2 were processed into ATY first, the softness and richly fluffy feel of the corresponding fabrics to the touch made therefrom still were worse than that of the fabrics produced from the TPU self-crimping conjugate fiber of the present disclosure.

In summary, by simultaneously combining a TPU containing a dicarboxyphenyl polyester structure unit represented by Formula (I) and another TPU, the present disclosure indeed can form a conjugate fiber with a self-crimpness. Moreover, the TPU self-crimping conjugate fiber is easy to be knitted and processed, so it is suitable for diversified knitting manners. Also, the fabrics made therefrom are soft, with good elasticity, and have comfortable touch which really belong to the unexpected effect. Further, since said fabrics can be directly recycled, it can reduce a lot of energy waste and reduce the burden on the environment. That is, it is conducive to textile recycling and is more in line with the trend of sustainable development. Therefore, the potential business value of the present disclosure is really high.

Even though numerous characteristics and advantages of the present disclosure have been set forth in the foregoing description, together with details of the structure and features of the disclosure, the disclosure is illustrative only. Changes may be made in the details, especially in matters of shape, size, and arrangement of parts within the principles of the disclosure to the full extent indicated by the broad general meaning of the terms in which the appended claims are expressed.

What is claimed is:

1. A thermoplastic polyurethane (TPU) self-crimping conjugate fiber comprising:

a first component including a first TPU; and a second component including a second TPU, which is a TPU other than the first TPU;

wherein the first TPU has a damping factor (tanδ) peak within a temperature range from 20° C. to 100° C., and the second TPU has a tanδ peak within a temperature range from −50° C. to 70° C.;

wherein based on a total weight of the first component, a content of the first TPU is 50% by weight or more;

wherein the first TPU comprises a structural unit represented by Formula (I):

(I)

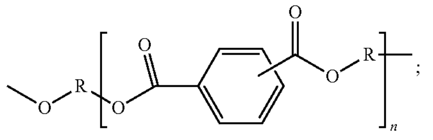

in Formula (I), each R independently is an alkylene group having 2 to 8 carbon atoms or $—CH_2CH_2OCH_2CH_2—$;

n is a number from 2 to 13; and the structural unit represented by Formula (I) has a number-average molecular weight ranging from 700 grams per mole (g/mole) to 2500 g/mole.

2. The TPU self-crimping conjugate fiber according to claim 1, wherein the first TPU comprises a structural unit represented by Formula (II):

(II)

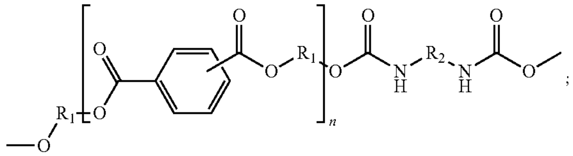

in Formula (II), each $R_1$ independently is an alkylene group having 2 to 8 carbon atoms or $—CH_2CH_2OCH_2CH_2—$;

$R_2$ is

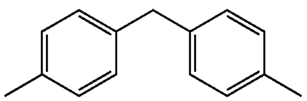

or

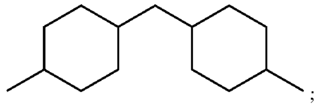

and n is a number from 2 to 13.

3. The TPU self-crimping conjugate fiber according to claim 2, wherein the second TPU is a TPU which has a moiety derived from an aliphatic polyol.

4. The TPU self-crimping conjugate fiber according to claim 3, wherein the damping factor peak of the first TPU ranges from 0.5 to 1.5.

5. The TPU self-crimping conjugate fiber according to claim 3, wherein the damping factor peak of the second TPU ranges from 0.1 to 0.4.

6. The TPU self-crimping conjugate fiber according to claim 4, wherein a difference between the damping factor peak of the first TPU and the damping factor peak of the second TPU ranges from 0.32 to 1.16.

7. The TPU self-crimping conjugate fiber according to claim 4, wherein the first TPU has a surface softening-sticky temperature ranging from 120° C. to 200° C.

8. The TPU self-crimping conjugate fiber according to claim 5, wherein the second TPU has a surface softening-sticky temperature ranging from 120° C. to 200° C.

9. The TPU self-crimping conjugate fiber according to claim 7, wherein the second TPU has a surface softening-sticky temperature ranging from 120° C. to 200° C.

10. The TPU self-crimping conjugate fiber according to claim 1, wherein based on the total weight of the first component, the content of the first TPU ranges from 60 weight percent (wt %) to 100 wt %.

11. The TPU self-crimping conjugate fiber according to claim 6, wherein based on the total weight of the first component, the content of the first TPU ranges from 60 wt % to 100 wt %.

12. The TPU self-crimping conjugate fiber according to claim 9, wherein based on the total weight of the first component, the content of the first TPU ranges from 60 wt % to 100 wt %.

13. The TPU self-crimping conjugate fiber according to claim 1, wherein a volume ratio of the first component to the second component ranges from 3:7 to 7:3.

14. The TPU self-crimping conjugate fiber according to claim 6, wherein a volume ratio of the first component to the second component ranges from 3:7 to 7:3.

15. The TPU self-crimping conjugate fiber according to claim 9, wherein a volume ratio of the first component to the second component ranges from 3:7 to 7:3.

16. The TPU self-crimping conjugate fiber according to claim 1, wherein the TPU self-crimping conjugate fiber has a multifilament structure.

17. The TPU self-crimping conjugate fiber according to claim 12, wherein the TPU self-crimping conjugate fiber has a multifilament structure.

18. A fabric comprising the TPU self-crimping conjugate fiber according to claim 1.

19. The fabric according to claim 18, wherein the fabric is made by weaving or knitting.

20. The fabric according to claim 18, wherein the fabric is made by circular knitting.

* * * * *